(12) United States Patent
Aruga

(10) Patent No.: US 8,003,213 B2
(45) Date of Patent: *Aug. 23, 2011

(54) COMPOSITE PARTICLES COMPRISING COATING OF CERIUM OXIDE AND SILICON OXIDE, AND APPLICATION THEREOF

(75) Inventor: Hiroshi Aruga, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 121 days.

This patent is subject to a terminal disclaimer.

(21) Appl. No.: 12/488,758

(22) Filed: Jun. 22, 2009

(65) Prior Publication Data

US 2010/0015436 A1    Jan. 21, 2010

Related U.S. Application Data

(63) Continuation of application No. PCT/JP07/074568, filed on Dec. 20, 2007.

(30) Foreign Application Priority Data

Dec. 22, 2006 (JP) ................. 2006-345949

(51) Int. Cl.
*B32B 5/16* (2006.01)

(52) U.S. Cl. ......... 428/403; 428/331; 428/339; 428/404

(58) Field of Classification Search .......... 428/403–406, 428/331, 339
See application file for complete search history.

(56) References Cited

U.S. PATENT DOCUMENTS

| | | | |
|---|---|---|---|
| 6,187,438 B1 * | 2/2001 | Chopin et al. | 428/403 |
| 6,623,858 B1 * | 9/2003 | Yabe et al. | 428/403 |
| 6,767,377 B2 * | 7/2004 | Schumacher et al. | 51/308 |
| 6,773,814 B2 * | 8/2004 | Schumacher et al. | 428/404 |
| 7,244,302 B2 * | 7/2007 | Schumacher et al. | 106/446 |
| 7,413,599 B2 * | 8/2008 | Henglein et al. | 106/415 |
| 2009/0263650 A1 * | 10/2009 | Aruga | 428/338 |

FOREIGN PATENT DOCUMENTS

| | | |
|---|---|---|
| JP | 59-184264 | 10/1984 |
| JP | 7-315838 | 12/1995 |
| JP | 10-292056 | * 11/1998 |
| JP | 2000506487 | 5/2000 |
| JP | 2000212054 A | 8/2000 |
| JP | 2000319128 A | 11/2000 |
| JP | 2003112923 A | 4/2003 |

* cited by examiner

Primary Examiner — Hoa (Holly) Le
(74) Attorney, Agent, or Firm — Oblon, Spivak, McClelland, Maier & Neustadt, L.L.P.

(57) ABSTRACT

Composite particles, wherein each particle contains titanium oxide, a first covering layer containing cerium oxide and a second covering layer containing silicon oxide in this order from the inside, and wherein the amount of cerium oxide is from 3 to 30 parts by mass based on 100 parts by mass of titanium oxide, the amount of silicon oxide is from 5 to 60 parts by mass based on 100 parts by mass of titanium oxide, and the average particle size of the composite particles is from 0.15 to 3 μm. The composite particles suppress discoloration, decomposition and photocatalytic reaction of titanium oxide by ultraviolet rays and show excellent resistance against hydrogen fluoride. Discoloration, changes in visible light transmittance, and decreases in the mechanical strength of coating compositions, printing inks, and resin films coated with printing inks containing the composite particles are suppressed for long periods of time.

17 Claims, 5 Drawing Sheets

COMPOSITE PARTICLES COMPRISING COATING OF CERIUM OXIDE AND SILICON OXIDE, AND APPLICATION THEREOF

TECHNICAL FIELD

The present invention relates to composite particles containing titanium oxide, a composition for forming a coating layer containing the composite particles and a coated article comprising a coating layer formed from the composition for forming a coating layer, particularly a resin film having the coating layer.

BACKGROUND ART

A fluororesin film is excellent in weather resistance, stain resistance, etc. and is therefore used as a roof material, a wall covering material, etc. for buildings/architecture such as outdoor exhibition halls, sports facilities and agricultural greenhouses (a building/architecture wherein a fluororesin film is used for the roof material, the wall covering material or the like will sometimes be referred to as a membrane structure). However, a fluororesin film has a high visible light transmittance and accordingly when it is used as a roof material, a wall covering material or the like, the interior may be too bright or the inside temperature may increase too much, and accordingly it is required to suppress the visible light transmittance.

As a method of suppressing the visible light transmittance of a fluororesin film, a method of reflecting the visible light and a method of absorbing the visible light may be mentioned. Among them, by the method of absorbing the visible light, the temperature of the fluororesin film tends to increase, whereby mechanical strength will decrease. Accordingly, the method of reflecting the visible light is preferred.

As a method of reflecting the visible light entering the fluororesin film, a method of forming on a resin film a coating layer containing a white pigment such as a titanium oxide pigment having a high refractive index may be mentioned.

However, a fluororesin film having a coating layer containing a titanium oxide pigment formed on the resin film has the following drawbacks.

i) Titanium oxide is likely to undergo discoloration and decomposition by ultraviolet rays. As a result, the fluororesin film is likely to undergo discoloration or a change in the visible light transmittance.

(ii) The fluororesin film and the coating layer are likely to undergo discoloration or a decrease in mechanical strength by photocatalytic reaction of titanium oxide by ultraviolet rays. As a result, the fluororesin film is likely to undergo discoloration, a change in the visible light transmittance or a decrease in mechanical strength.

(iii) Hydrogen fluoride tends to be generated by decomposition of the fluororesin by photocatalytic reaction of titanium oxide, and another color pigment blended in the coating layer together with the white pigment undergoes discoloration by hydrogen fluoride. As a result, the fluororesin film is likely to undergo discoloration or a change in the visible light transmittance.

As a pigment which overcomes the above problem (i), the following pigment has been proposed.

(1) A pigment which is a pigment comprising cerium oxide and dense amorphous silica precipitated on the surface of rutile-type titanium oxide, having an amount of cerium oxide of from 0.01 to 1.0 mass % of titanium oxide, and an amount of the dense amorphous silica of from 1 to 8 mass % of titanium oxide (Patent Document 1).

(2) A pigment which is a pigment comprising rutile $TiO_2$ particles having a covering comprising alumina or alumina/silica, and which has cerium cations in an amount of from 0.5 to 2 wt % of $TiO_2$ and sulfate anions, phosphate anions or silicate anions in a stoichiometric amount bonded to the particle surface (Patent Document 2).

However, the present inventors consider as follows. That is, with respect to the above pigment (1) or (2), although discoloration and decomposition of the pigment itself by ultraviolet rays are suppressed, the photocatalytic reaction of the pigment is not sufficiently suppressed. Particularly, its use together with a fluororesin is not considered, countermeasures against hydrogen fluoride are not taken. Accordingly, the problems (ii) and (iii) are not overcome, and the fluororesin film will undergo discoloration, a change in the visible light transmittance and a decrease in mechanical strength.

On the other hand, heretofore, a titanium oxide pigment has been used as a white pigment for a coating material. Various proposals have been made with respect to improvement in weather resistance of a coating layer formed from a coating material containing a titanium oxide pigment. However, a white coating material capable of forming a coating layer excellent in weather resistance and acid rain resistance so that brightness of the coating layer will not be impaired particularly after exposure to the outdoors for 10 years or longer has not been obtained. For example, in a case of forming a coating layer on a metal substrate, adhesion between the coating layer and the metal substrate will be maintained even after long exposure to the outdoor. However, by photocatalytic reaction of titanium oxide by ultraviolet rays, discoloration or cracking on the surface layer of the coating layer may occur, or a resin binder and the pigment may be peeled off from the surface layer of the coating layer.

Patent Document 1: JP-A-7-315838
Patent Document 2: JP-A-59-184264

DISCLOSURE OF THE INVENTION

Objects to be Accomplished by the Invention

It is an object of the present invention to provide composite particles of which discoloration, decomposition and photocatalytic reaction by ultraviolet rays are suppressed even though titanium oxide is contained, which are excellent in resistance against hydrogen fluoride and which have a color intrinsic to particles containing titanium oxide used as the core.

Further, it is an object of the present invention to provide a composition for forming a coating layer capable of forming a coating layer of which discoloration, a change in the visible light transmittance, a decrease in mechanical strength and a decrease in the brightness of the coating layer are suppressed for a long time even though titanium oxide is contained, particularly a composition for forming a coating layer to be used as a printing ink.

Further, it is an object of the present invention to provide a coated article having a coating layer of which discoloration and a decrease in the brightness of the coating layer are suppressed over a long time even though titanium oxide is contained.

Still further, it is an object of the present invention to provide a resin film having a coating layer of which discoloration, a change in the visible light transmittance and a decrease in mechanical strength are suppressed for a long time even though the coating layer contains titanium oxide.

Means to Accomplish the Objects

The present invention provides composite particles each comprising a particle containing titanium oxide, a first covering layer containing cerium oxide and a second covering layer containing silicon oxide in this order from the inside, wherein the amount of cerium oxide is from 3 to 30 parts by mass based on 100 parts by mass of titanium oxide, the amount of silicon oxide is from 5 to 60 parts by mass based on 100 parts by mass of titanium oxide, and the average particle size of the composite particles is from 0.15 to 3 μm.

The amount of cerium oxide is preferably from 5 to 30 parts by mass based on 100 parts by mass of titanium oxide.

The present invention further provides a composition for forming a coating layer comprising the above composite particles, a resin and a liquid medium.

The above resin is preferably a fluororesin.

Further, the present invention provides a printing ink comprising the above composition for forming a coating layer.

Further, the present invention provides a coating composition comprising the above composition for forming a coating layer.

Further, the present invention provides a coated article having a coating layer formed from the above composition for forming a coating layer.

Still further, the present invention provides a resin film having a coating layer formed from the above composition for forming a coating layer formed on at least one side.

The above coating layer is preferably a coating layer formed from the composition for forming a coating layer by a printing method.

The resin film of the present invention is preferably a fluororesin film.

The resin film of the present invention preferably has a visible light transmittance of from 20 to 75% as measured in accordance with JIS R3106.

Effects of the Invention

Of the composite particles of the present invention, discoloration, decomposition and photocatalytic reaction by ultraviolet rays are suppressed even though titanium oxide is contained, they are excellent in resistance against hydrogen fluoride, and they have a color intrinsic to particles containing titanium oxide used as the core.

According to the composition for forming a coating layer of the present invention, a coating layer of which discoloration, a change in the visible light transmittance, a decrease in mechanical strength and a decrease in the brightness of the coating layer are suppressed for a long time even though titanium oxide is contained, can be formed.

The coated article of the present invention has a coating layer of which discoloration and a decrease in the brightness of the coating layer are suppressed for a long time even though titanium oxide is contained.

Of the resin film having a coating layer of the present invention, discoloration, a change in the visible light transmittance and a decrease in mechanical strength are suppressed for a long time even though the coating layer contains titanium oxide.

MEANINGS OF SYMBOLS

Figure 1:
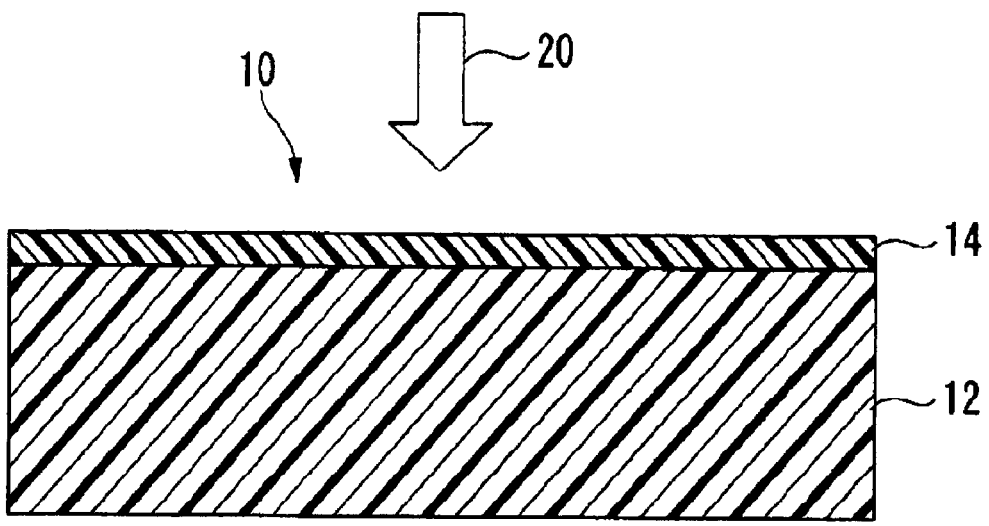
FIG. 1 is a cross-sectional view illustrating one example of the resin film having a coating layer of the present invention.

10: Resin film with a coating layer
12: Resin film
14: Coating layer

BEST MODE FOR CARRYING OUT THE INVENTION

In the present invention, the coating layer is a thin layer containing composite particles and a resin formed on the surface of a substrate. The resin in the coating layer and the composition for forming a coating layer will be referred to as "a resin binder". This coating layer is obtained by forming a thin layer (also called "a wet layer") of the composition for forming a coating layer on the surface of a substrate and removing a liquid medium. In a case where the resin binder is a curable resin, the resin binder can be cured simultaneously with removal of the liquid medium or after removal of the liquid medium. A non-curable resin is solidified by removal of the liquid medium or may be heated and melted after the removal and then cooled to be solidified.

A wet layer is formed on the entire or a part of the aimed surface of the substrate by a printing method or coating method. Hereinafter a composition for forming a coating layer to be applied to the printing method will be referred to as "a printing ink". The printing method is a method of supplying a part of the aimed surface of a substrate with a printing ink to form a surface portion on which a coating layer is formed and a surface portion on which a coating layer is not formed, and usually patterns, images, characters, etc. are formed by the portion having a coating layer.

Further, a method of forming a coating layer by a method other than the printing method will be referred to as "a coating method", and a composition for forming a coating layer to be applied to the coating method will be referred to as "a coating composition". The coating method is usually a method of forming a coating layer on the entire surface of the aimed surface of a substrate. Patterns, images, characters, etc. can be formed also by the coating method by preliminarily forming a portion to which the resin composition is to be attached and a portion to which the coating composition is not to be attached on the surface of a substrate.

The composition for forming a coating layer of the present invention comprises, in addition to the composite particles and the resin binder, a liquid medium for dispersion of the composite particles and for dissolution or dispersion of the resin binder. The liquid medium means a liquid which is liquid at room temperature (its boiling point is usually at most 150° C.) such as water or an organic solvent and will sometimes be referred to simply as a solvent. Application of the composite particles of the present invention is not limited to this application as a component of the composition for forming a coating layer of the present invention. For example, a composition for forming a coating layer similar to that of the present invention can be obtained without use of the above liquid medium by using a liquid curable resin as the resin binder.

As described above, the composite particles of the present invention are invented primarily for the purpose of overcoming the problems when applied to a fluororesin material. As the material with which the composite particles in the coating layer are in direct contact or which the composite particles in the coating layer influence (or which is influenced by the composite particles) may be a substrate material and a resin binder. Accordingly, the composite particles of the present invention are preferably applied to a case where the substrate material is a fluororesin material or the resin binder is a fluororesin binder. More preferably, the composite particles of the present invention are applied to a case where a coating layer is formed on a substrate made of a fluororesin material by using the composition for forming a coating layer using a fluororesin binder. The substrate made of a fluororesin material may be the above fluororesin film. However, in the present invention, the material of a substrate on which the coating layer is formed is not limited to a fluororesin. For example, a coating film can be formed by applying the composition for forming a coating layer of the present invention to a substrate made of a material e.g. a resin material other than the fluororesin material or an inorganic material such as a metal or a ceramic. However, in such a case, the resin binder in the composition for forming a coating layer is preferably a fluororesin binder. Further, for example, a coating layer can be formed on a substrate using the composition for forming a coating layer of the present invention using a resin binder other than the fluororesin binder. However, in such a case, the substrate is preferably a substrate made of a fluororesin material.

<Composite Particles>

The composite particles of the present invention are composite particles each comprising a particle containing titanium oxide, a first covering layer containing cerium oxide and a second covering layer containing silicon oxide in this order from the inside.

The average particle size of the composite particles is from 0.15 to 3 μm, preferably from 0.2 to 2 μm. When the average particle size of the composite particles is at least 0.15 μm, they can sufficiently reflect visible light as different from composite particles (average particle size: at most 0.1 μm) for cosmetics which are required to have transparency. When the average particle size of the composite particles is at most 3 μm, a smooth coating layer can be formed. The average particle size of the composite particles is from about 1.1 to about 10 times the average particle size of the particles containing titanium oxide to be used as the core.

The average particle size of the composite particles is measured by using a scanning electron microscope (SEM). As the measuring method, the composite particles of the present invention are put, for example, in an alcohol such as isopropanol to adjust the solid content concentration to be about 0.1 mass %, and the composite particles were completely dispersed by ultrasonic waves, dropped on a collodion film and dried, whereupon SEM observation is carried out. In the present invention, the particle size is the particle diameter of particles observed, and the average particle size is defined as the average value of 20 randomly sampled particles in the SEM image. In the present invention, the average particle size is calculated by this method.

(Particles Containing Titanium Oxide)

The composite particles of the present invention are required to sufficiently reflect visible light. Accordingly, as the core, particles containing titanium oxide having a high refractive index are used. As disclosed in JP-A-10-292056, if silicon oxide particles (e.g. silica, talc or mica) having a low refractive index are used, visible light can not sufficiently be reflected, and accordingly a large amount of composite particles will be required so as to suppress the visible light transmittance of the resin film.

The particles containing titanium oxide may, for example, be a titanium oxide particles, mica covered with titanium oxide or a pigment of a composite oxide containing titanium oxide. Among them, preferred is a titanium oxide pigment in view of reflection of visible light, and more preferred is a titanium oxide pigment having high sphericity.

The composite oxide containing titanium oxide may, for example, be CrSbTi oxide (orange), FeAlTi oxide (orange), NiSbTi oxide (lemon), NiCoZnTi oxide (green) or MnSbTi oxide (brown). Further, the pigment of such a composite oxide may, for example, be a yellow pigment (titanium yellow, chrome yellow, etc.) a green pigment (cobalt zinc titanium), etc.) or a brown pigment (manganese brown, etc.).

The composite oxide containing titanium oxide also undergoes discoloration and decomposition by ultraviolet rays and exhibits photocatalytic reaction. Accordingly, a particle of the composite oxide is covered with a first covering layer containing cerium oxide and a second covering layer containing silicon oxide, whereby composite particles of which discoloration and decomposition by ultraviolet rays and photocatalytic reaction are suppressed, which are excellent in resistance against hydrogen fluoride and which have a color intrinsic to the particles of the composite oxide used as the core will be obtained.

The average particle size of the particles containing titanium oxide is preferably from 0.1 to 2 μm, more preferably from 0.2 to 1 μm. When the average particle size of the particles containing titanium oxide is at least 0.1 μm, visible light can sufficiently be reflected as different from a titanium oxide pigment (average particle size: at most 0.05 μm) for cosmetics which is required to have transparency. When the average particle size of the particles containing titanium oxide is at most 2 μm, a smooth coating layer can be formed.

The average particle size of the particles containing titanium oxide is preferably calculated and determined by the same method as that for the composite particles of the present invention.

(First Covering Layer)

The first covering layer is a layer containing cerium oxide. Since cerium oxide has high ultraviolet shielding performance, the first covering layer can decrease ultraviolet rays which reach the particles containing titanium oxide.

The first covering layer may be a layer consisting of cerium oxide alone or may be a layer comprising a composite of cerium oxide with another metal oxide. The first covering layer is preferably a layer comprising cerium oxide alone in view of high ultraviolet shielding performance.

Also in a case where a second covering layer alone is formed without forming the first covering layer, deterioration of the substrate (e.g. a resin film) by photocatalytic reaction can be suppressed to a certain extent since the particles containing titanium oxide and the substrate (e.g. a resin film) are not in contact with each other. However, the effect of suppressing deterioration of the substrate (e.g. a resin film) is low as compared with a case where the first covering layer and the second covering layer are formed. That is, it is shown that to suppress deterioration of the substrate (e.g. a resin film), it is more effective to decrease ultraviolet rays which reach the particles containing titanium oxide rather than to prevent the particles containing titanium oxide from being in contact with the substrate.

Similarly, with respect to the relation between the composite particles and the resin binder also, deterioration of the coating film by photocatalytic reaction can be suppressed to a certain extent also in a case of forming a second covering layer alone without forming the first covering layer since the particles containing titanium oxide and the resin binder are not in contact with each other. However, the effect of suppressing deterioration of the coating layer is low as compared with a case where the first covering layer and the second covering layer are formed. That is, it is shown that to suppress deterioration of the coating layer, it is more effective to decrease ultraviolet rays which reach the particles containing titanium oxide rather than to prevent the particles containing titanium oxide from being in contact with the resin binder.

The amount of cerium oxide contained in the first covering layer is from 3 to 30 parts by mass, preferably from 5 to 30 parts by mass, more preferably from 8 to 20 parts by mass, based on 100 parts by mass of titanium oxide contained in the particles containing titanium oxide. When the amount of cerium oxide based on 100 parts by mass of titanium oxide is at most 3 parts by mass, the ultraviolet shielding performance will sufficiently be high. Particularly for applications under severer conditions such as after-mentioned back printing, the amount of cerium oxide is preferably at least 5 parts by mass based on 100 parts by mass of titanium oxide. When the amount of cerium oxide based on 100 parts by mass of titanium oxide is at most 30 parts by mass, yellowness specific to cerium oxide can be suppressed, whereby the color intrinsic to particles containing titanium oxide used as the core can be reproduced. Further, the first covering layer is not too thick, whereby the decrease in adhesion to the particles containing titanium oxide can be suppressed, whereby the first covering layer and the second covering layer are less likely to be peeled off when the composition for forming a coating layer is prepared. The pigment as disclosed in Patent Document 1 has insufficient ultraviolet shielding performance since the amount of cerium oxide is extremely small, and the photocatalytic reaction of the pigment is not sufficiently suppressed.

(Second Covering Layer)

The second covering layer is a layer containing silicon oxide. Silicon oxide weakens the yellowness of cerium oxide, and accordingly the color intrinsic to the particles containing titanium oxide used as the core can be reproduced. Further, although silicon oxide has weak ultraviolet shielding performance as compared with cerium oxide, it has high resistance against hydrogen fluoride generated from the fluororesin substrate or the fluororesin binder (or in the case of a resin binder other than the fluororesin, an acidic decomposed product generated from the resin binder) as compared with cerium oxide. As a result, the second covering layer protects the first covering layer containing cerium oxide from an acidic decomposed product such as hydrogen fluoride and suppresses the decrease in ultraviolet shielding performance of the first covering layer.

The mechanism of the decrease in ultraviolet shielding performance of the first covering layer by hydrogen fluoride is as follows.

If the coating layer or the substrate (resin film) contains a fluororesin, hydrogen fluoride is generated from the following reasons.

(I) In a case where surface treatment such as corona discharge treatment is carried out before a coating layer is formed on a resin film containing a fluororesin, hydrogen fluoride is generated by decomposition of the fluororesin.

(II) When the resin film is exposed to solar light, hydrogen fluoride is generated by photodecomposition of the fluororesin.

(III) If titanium oxide which is not sufficiently covered exists, hydrogen fluoride is generated by decomposition of the fluororesin in the resin film or the resin binder by photocatalytic reaction of the titanium oxide.

(IV) Even when a fluororesin which is regarded to have highest weather resistance is used as the resin binder, it undergoes photodecomposition by exposure for 10 years or longer, whereby a very small amount of hydrogen fluoride is generated, or hydrogen chloride is generated derived from a constituting element of the raw material monomer. If cerium oxide is reacted with hydrogen fluoride, it becomes cerium fluoride having low ultraviolet shielding performance, whereby the ultraviolet shielding performance of the first covering layer decreases.

Further, the mechanism of the decrease in ultraviolet shielding performance of the first covering layer by an acidic decomposed product in a case where a resin other than the fluororesin is used as the resin binder is as follows.

(V) In a case where the resin binder is a urethane resin, an acrylic resin or an acrylic silicone resin, the resin itself has low weather resistance, whereby an acidic decomposed product such as an acrylic acid is generated.

(VI) If titanium oxide which is not sufficiently covered exists, an acidic decomposed product is generated by decomposition of the resin binder by photocatalytic reaction by the titanium oxide.

If cerium oxide is reacted with an acidic decomposed product, it becomes a water-soluble cerium salt having low ultraviolet shielding performance such as cerium chloride or cerium nitrate, whereby it is easily dissolved in rain, whereby the ultraviolet shielding performance of the first covering layer decreases.

The second covering layer may be a layer comprising silicon oxide alone or may be a layer comprising a composite oxide of silicon oxide with another metal oxide. Such another metal oxide may, for example, be zirconium oxide or aluminum oxide. The second covering layer is preferably a layer comprising silicon oxide alone or a layer comprising silicon oxide as the main component in view of high resistance against hydrogen fluoride.

Silicon oxide may be non-style silica or crystalline silica. The non-style silica is amorphous silica having no crystallinity.

The amount of silicon oxide contained in the second covering layer is from 5 to 60 parts by mass, preferably from 10 to 30 parts by mass, based on 100 parts by mass of titanium oxide contained in the particles containing titanium oxide. When the amount of silicon oxide is at least 5 parts by mass based on 100 parts by mass of titanium oxide, the first covering layer containing cerium oxide can sufficiently be protected from hydrogen fluoride. When the amount of silicon oxide is at most 60 parts by mass based on 100 parts by mass of titanium oxide, the second covering layer is not too thick, whereby the second covering layer is less likely to be peeled off when the composition for forming a coating layer is prepared. Further, since the decrease in the refractive index of the composite particles is suppressed, the amount of the composite particles required to suppress the visible light transmittance of the resin film can be decreased. With respect to the pigment disclosed in Patent Document 1, since its use with a fluororesin is not assumed, the amount of dense amorphous silica is relatively small, whereby cerium oxide cannot sufficiently be protected from hydrogen fluoride in some cases.

The amount of silicon oxide contained in the second covering layer is preferably from 50 to 300 parts by mass, more preferably from 100 to 200 parts by mass, based on 100 parts by mass of cerium oxide contained in the first covering layer. When the amount of silicon oxide is at least 50 parts by mass based on 100 parts by mass of cerium oxide, the first covering layer containing cerium oxide can sufficiently be protected from hydrogen fluoride. When the amount of silicon oxide is at most 300 parts by mass based on 100 parts by mass of cerium oxide, the second covering layer is not too thick, whereby the second covering layer is less likely to be peeled off when the composition for forming a coating layer is prepared. Further, since the decrease in the refractive index of the composite particles is suppressed, the amount of the composite particles required to suppress the visible light transmittance of the resin film can be decreased.

(Another Layer)

The composite particles of the present invention may have another layer on at least one of between the particle containing titanium oxide and the first covering layer, between the first covering layer and the second covering layer and outside the second covering layer, as the case requires.

Such another layer may, for example, be an aluminum oxide layer or a surface active agent layer to be formed on the outside of the second covering layer. The aluminum oxide layer or the surface active agent layer is a layer which improves affinity (dispersibility) of the composite particles to the fluororesin. The surface active agent may, for example, be a silicone oil or stearic acid.

(Process for Producing Composite Particles)

The composite particles of the present invention can be produced by a production process (A) comprising the following steps (a) to (c) or a production process (B) comprising the following steps (d) to (f).

Production Process (A):

(a) A step of depositing an insoluble cerium compound on particles containing titanium oxide to obtain particles covered with the insoluble cerium compound.

(b) A step of forming a second covering layer on the particles covered with the insoluble cerium compound to obtain precursor particles.

(c) A step of firing the precursor particles to convert the insoluble cerium compound to cerium oxide thereby to obtain composite particles.

Production Process (B):

(d) A step of depositing an insoluble cerium compound on particles containing titanium oxide to obtain particles covered with the insoluble cerium compound.

(e) A step of firing the particles covered with the insoluble cerium compound to convert the insoluble cerium compound to cerium oxide thereby to obtain particles covered with cerium oxide.

(f) A step of forming a second covering layer on the particles covered with cerium oxide to obtain composite particles.

Step (a):

The insoluble cerium compound is a cerium compound insoluble in water. The insoluble cerium compound may, for example, be cerium hydroxide, cerium phosphate or cerium carbonate and is preferably cerium hydroxide.

The particles covered with an insoluble cerium compound can be produced, for example, by the following process.

Particles containing titanium oxide are dispersed in water to obtain an aqueous dispersion. An aqueous cerium nitrate solution is dropwise added to the aqueous dispersion while heating the aqueous dispersion. Then, an aqueous sodium hydroxide solution is dropwise added to the aqueous dispersion so that the pH of the aqueous dispersion will be from 7 to 9, whereby cerium hydroxide is deposited on the particles containing titanium oxide. Then, the liquid containing the particles covered with an insoluble cerium compound is subjected to filtration, and the particles covered with an insoluble cerium compound are washed with water and dried.

Step (b):

The second covering layer is formed by hydrolyzing a silicate (such as sodium silicate) or by hydrolyzing an alkoxysilane (such as ethyl silicate).

The precursor particles can be produced, for example, by the following process.

The particles covered with an insoluble cerium compound are dispersed in water by using a dispersing machine, an emulsifying machine or the like to obtain an aqueous dispersion. A silicate solution (e.g. No. 3 sodium silicate) is dropwise added to the aqueous dispersion with stirring, followed by hydrolysis to form a second covering layer on the particles covered with an insoluble cerium compound. The liquid containing the precursor particles is subjected to filtration, and the obtained precursor particles are washed with water and dried.

Step (c):

Since cerium oxide is chemically stabler than the insoluble cerium salt, firing is carried out. The firing temperature is preferably from 200 to 1,000° C., more preferably from 400 to 600° C.

The firing time is preferably from 1 to 3 hours.

Agglomerates of the fired particles are crushed to obtain composite particles.

Step (d):

The step (d) is carried out in the same manner as in the step (a).

Step (e):

Since cerium oxide is chemically stabler than the insoluble cerium salt, firing is carried out. The firing temperature is preferably from 200 to 1,000° C., more preferably from 400 to 600° C.

The firing time is preferably from 1 to 3 hours.

Agglomerates of the fired particles are crushed to obtain particles covered with cerium oxide.

Step (f):

The composite particles can be produced, for example, by the following process.

The particles covered with cerium oxide are dispersed in a water/alcohol mixed dispersion medium to obtain a dispersion. An alkoxysilane (such as ethyl silicate) is added to the dispersion with stirring, followed by hydrolysis to form a second covering layer on the particles covered with cerium oxide. The liquid containing the composite particles is subjected to filtration, and the obtained composite particles are washed with water and dried (and fired as the case requires).

<Composition for Forming A Coating Layer>

The composition for forming a coating layer of the present invention is a composition for forming a coating layer by a printing method or a coating method. The composition for forming a coating layer to be used for the printing method will be referred to as "a printing ink", and the composition for forming a coating layer to be used for the coating method will be referred to as "a coating composition". They will be described below.

The composition for forming a coating layer of the present invention preferably contains from 5 to 50 mass %, more preferably from 15 to 30 mass % of the composite particles of the present invention based on 100 mass % of the entire composition for forming a coating layer. Further, the composition for forming a coating layer of the present invention contains a resin solid content in an amount of preferably from 5 to 60 mass %, more preferably from 15 to 40 mass %, based on 100 mass % of the entire composition for forming a coating layer.

<Printing Ink>

The printing ink of the present invention is a printing ink containing the composite particles of the present invention as a pigment. The printing ink of the present invention contains a resin binder, the composite particles of the present invention and a solvent (liquid medium).

The resin binder is usually sold in the form of a solid or liquid resin or in the form of a solution or a dispersion of the resin in a solvent. Particularly preferred is a solvent-soluble resin.

The resin binder is preferably a fluororesin, an acrylic polyol, an acrylic resin, an acrylic silicone or the like which itself has high weather resistance and is excellent in adhesion to the resin film, and it is more preferably a fluororesin which has high weather resistance. Such a fluororesin is preferably a fluororesin with favorable solubility in a solvent, which has been known as a fluororesin for a coating composition.

The fluororesin may, for example, be "Lumiflon" (tradename) manufactured by Asahi Glass Company, Limited or "THV" (tradename) manufactured by Dyneon, which is commercially available as a fluororesin for a coating composition. Such a fluororesin is soluble in a solvent such as toluene or methyl ethyl ketone and is preferred as the resin binder. The fluororesin for a coating composition is usually a thermocurable resin type to be used in combination with a curing agent, but there is a fluororesin for a coating composition with which no curing agent is used. The above "Lumiflon" is a copolymer having fluoroethylene units and vinyl ether units and usually has hydroxyl groups. The fluororesin having hydroxyl groups is used in combination with a curing agent, but use in combination with a curing agent is not essential. When a curing agent is used in combination, a relatively hard coating layer can be obtained, and when no curing agent is used in combination, a relatively flexible coating layer can be obtained.

The acrylic polyol is a copolymer of a monomer having a hydroxyl group such as a hydroxyalkyl acrylate or a hydroxyalkyl methacrylate with another monomer such as an alkyl acrylate or an alkyl methacrylate, and it is used with a curing agent in combination in many cases similar to the above hydroxyl group-containing fluororesin. The acrylic polyol may, for example, be ACRIT QT507-28 manufactured by TAISEI FINE CHEMICAL CO., LTD.

The acrylic resin is a polymer of at least one acrylate monomer such as an alkyl acrylate or an alkyl methacrylate or a copolymer of such a monomer with another monomer. The acrylic resin may, for example, be DIANAL BP80 manufactured by MITSUBISHI RAYON CO., LTD.

The acrylic silicone is a copolymer having a polymer chain of an acrylic resin and an organosilicone chain of e.g. dimethylsilicone bonded. The acrylic silicone may, for example, be SILACOAT SCT-8102 manufactured by Chisso Corporation.

The solvent (liquid medium) may, for example, be an organic solvent such as toluene, xylene, methyl ethyl ketone, an alcohol, solvesso (an aromatic hydrocarbon mixture manufactured by Exxon Mobil), anone or N-methylpyrrolidone; or water. As the solvent, an optimum solvent is selected by considering the printing ink repellency on the resin film, the transfer rate, drying characteristics of the printing ink, the storage stability of the ink, etc. depending upon the printing method (gravure printing method, screen printing method or the like). For example, in the case of gravure printing on a fluororesin film, preferred is toluene, xylene, methyl ethyl ketone or a mixed solvent thereof, which will wet the surface of a fluororesin film subjected to surface treatment for printing and which has a not so high boiling point.

The printing ink may contain a solvent for dilution.

Preparation of the printing ink of the present invention is carried out, for example, as follows. The printing ink of the present invention contains the composite particles of the present invention preferably in an amount of from 5 to 50 mass % based on 100 mass % of the entire printing ink. If the content is less than 5 mass %, the shielding performance tends to be insufficient, whereby it may be difficult to obtain the aimed visible light transmittance. If the content exceeds 50 mass %, the viscosity at the time of printing tends to be too high, whereby clear printing free from defects tends to be difficult, and the adhesion to the substrate may be insufficient. The content is particularly preferably from 15 to 30 mass %.

Further, the printing ink of the present invention preferably contains a resin solid content in an amount of from 10 to 50 mass % based on 100 mass % of the entire printing ink. If the content is less than 10 mass %, a coating layer of at least 1 μm as the thickness after drying is hardly obtained, and no predetermined visible light transmittance may be obtained. If the content exceeds 50 mass %, the viscosity at the time of printing tends to be too high, whereby clear printing without defects may be difficult. The content is particularly preferably from 15 to 40 mass %.

The amount of the composite particles of the present invention is preferably from 30 to 200 parts by mass, more preferably from 50 to 150 parts by mass based on 100 parts by mass of the resin binder.

The printing ink may contain another pigment other than the composite particles of the present invention. Another pigment may be a coloring pigment such as an organic pigment or an inorganic pigment. Specifically, it may, for example, be carbon black (black pigment), iron oxide (red pigment), aluminum cobalt oxide (blue pigment), copper phthalocyanine (blue pigment, green pigment), perylene (red pigment) or bismuth vanadate (yellow pigment).

The total amount of the composite particles of the present invention and another pigment is preferably from 30 to 200 parts by mass, more preferably from 50 to 150 parts by mass based on 100 parts by mass of the resin binder.

<Resin Film with a Coating Layer>

A substrate on the surface of which a coating layer is formed by using the above printing ink by a printing method will be referred to as "a printing substrate". The printing substrate may be a substrate made of various materials. The composite particles of the present invention are a pigment capable of forming a coating layer having high durability to adjust the visible light transmittance and accordingly, the printing substrate is preferably a substrate having visible light transmittance. Such a substrate may, for example, be a resin film, a resin sheet or a glass sheet. In the present invention, the substrate is particularly preferably a resin film. The resin sheet is a sheet thicker than the after-mentioned resin film. In a case where the substrate is a flat substrate such as a resin film, the coating layer may be formed on one side of the substrate or may be formed on both sides.

FIG. 1 is a cross-sectional view illustrating one example of the resin film with a coating layer. The resin film 10 with a coating layer has a coating layer 14 on a resin film 12.

As described above, it is preferred that the coating layer 14 contains a fluororesin binder or the resin film 12 is a fluororesin film.

The material of the resin film 12 may, for example, be polyethylene, polypropylene, polyethylene terephthalate (hereinafter referred to as PET), an acrylic resin, polycarbonate or a fluororesin, and a fluororesin is preferred in view of weather resistance.

The fluororesin may, for example, be a vinyl fluoride polymer, a vinylidene fluoride polymer, a vinylidene fluoride/hexafluoropropylene copolymer, a tetrafluoroethylene/hexafluoropropylene/vinylidene fluoride copolymer, a tetrafluoroethylene/propylene copolymer, a tetrafluoroethylene/vinylidene fluoride/propylene copolymer, an ethylene/tetrafluoroethylene copolymer (hereinafter referred to as ETFE), a hexafluoropropylene/tetrafluoroethylene copolymer or a perfluoro(alkyl vinyl ether)/tetrafluoroethylene copolymer.

The fluororesin is preferably ETFE, a hexafluoropropylene/tetrafluoroethylene copolymer, a perfluoro(alkyl vinyl ether)/tetrafluoroethylene copolymer, a tetrafluoroethylene/hexafluoropropylene/vinylidene fluoride copolymer or a vinylidene fluoride polymer in view of good transparency and weather resistance.

The thickness of the resin film 12 is preferably from 5 to 500 μm, more preferably from 20 to 300 μm. If the thickness of the resin film exceeds 500 μm, flexibility of the film tends to be insufficient, and the film may not fit the design of a film having a curved shape, and if the thickness is less than 5 μm, handling tends to be difficult and in addition, the mechanical strength expected as the structural material may not be satisfied.

The layer thickness of the coating layer 14 is preferably from 0.2 to 20 μm. If the layer is too thick, the layer can not follow very slight expansion or shrinkage of the resin film by coldness and warmth, whereby the coating layer 14 may be peeled off. Further, if the layer is too thin, a very small loss of weight of the coating layer 14 may significantly decrease the coating layer performance. Therefore, sufficient attention must be paid against wear e.g. by contact with another material at the time of packing of during transport of the film and further, wear by sandstorms may occur. Accordingly, the layer thickness is more preferably from 0.5 to 10 μm, particularly preferably from 1 to 5 μm.

Figure 2:
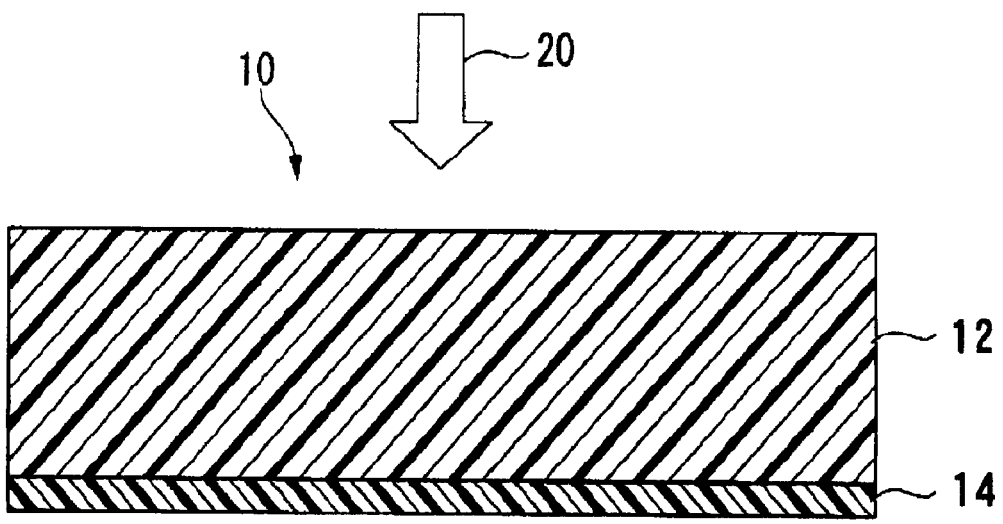
FIG. 2 is a cross-sectional view illustrating another example of the resin film having a coating layer of the present invention.

In a case where the resin film 10 with a coating layer is to be used as e.g. a roof material or a wall covering material, the membrane structure of the resin film 10 with a coating layer may be in the order (top printing) of the coating layer 14 and the resin film 12 from the side from which light 20 enters as shown in FIG. 1, or may be in the order (back printing) of the resin film 12 and the coating layer 14 from the side from which light 20 enters as shown in FIG. 2. At any rate, in view of weather resistance, one containing a fluororesin between the resin film 12 and the coating layer 14 is preferably on the side from which light 20 enters.

The resin film 10 with a coating layer can be formed, for example, by applying the printing ink to the surface of the resin film 12 by the printing method to form a wet layer, and volatilizing the solvent contained in the wet layer to form the coating layer 14. In a case where the resin binder in the printing ink is a curable resin, the resin binder is cured simultaneously with removal of the solvent by volatilization or after the removal of the solvent by volatilization. Curing of the resin binder is carried out usually by heat curing, but in a case of a room temperature curable resin, heating is not essential. In the case of a photocurable resin, it is cured by irradiation with e.g. ultraviolet rays.

The printing method may, for example, be a gravure printing method or screen printing method. Usually, patterns, images, characters or the like are formed on the surface of the resin film 12 by printing with the portion on which no coating layer 14 is present being the background and with the coating layer 14 being drawings. In a case where the ratio of the area of the coating layer 14 is high relative to the surface area of the resin film 12, the relation between the background and the drawings may be opposite in some cases. The visible light transmittance of the resin film 12 can be adjusted by adjusting the ratio of the area of the coating layer 14 to the surface area of the resin film 12 by forming a large number of coating layers in the form of dots or lines.

In order to improve adhesion between the coating layer 14 and the resin film 12, it is preferred to heat the coating layer at from 60° C. to 150° C. for from 2 to 30 seconds while removing the solvent in the wet film or after the solvent is removed, after printing. In a case where the resin binder is a curable resin, sufficient curing is achieved by such heating. In a case where the resin binder is a non-curable resin also, the adhesion to the resin film 12 can be improved. For example, in the case of a hydroxyl group-containing fluororesin with which no curing agent is used in combination, hydroxyl groups of the resin binder are reacted with functional groups formed on the surface of the fluororesin film subjected to surface treatment as described below thereby to improve adhesion between the coating layer 14 and the resin film 12.

At the time of printing, in order to improve adhesion between the coating layer 14 and the resin film 12, it is preferred to preliminarily apply surface treatment to the surface on which the coating layer 14 is to be formed of the resin film 12.

The surface treatment may, for example, be corona discharge treatment, metal sodium treatment, mechanical surface roughening treatment or excimer laser treatment, and preferred is corona discharge treatment, which can be carried out at a low cost.

In a case where corona discharge treatment is carried out, successive treatment by disposing a corona discharge treatment machine on the production line of the resin film 12 is advantageous in view of the production process. The treatment conditions are selected depending upon the material of the resin film 12 to be treated and the desired degree of treatment. The corona discharge treatment is carried out preferably under conditions of an intensity of from 0.1 to 10 kW, and a treating time of from 0.5 to 100 m$^2$/min.

The surface treatment is carried out so that the surface tension of the resin film 12 will be at least 0.035 N/m so as to obtain favorable adhesion between the coating layer 14 and the resin film 12. The surface tension of the resin film is more preferably at least 0.04 N/m.

It is considered that by applying the surface treatment, oxygen-containing functional groups and/or nitrogen-containing functional groups are introduced to the surface of the resin film 12, and after printing, the functional groups on the surface of the resin film 12 and oxygen-containing functional groups (such as hydroxyl groups or carboxyl groups) in the fluororesin, the silicone resin, the acrylic silicone resin, the curing agent or the like in the coating layer 14 form chemical bonds to improve adhesion between the coating layer 14 and the resin film 12.

The visible light transmittance of the resin film 10 with a coating layer is preferably from 20 to 75%, more preferably from 30 to 65%. When the visible light transmittance of the resin film 10 with a coating layer is at least 20%, a screen effect can be produced such that the inside is hardly seen in detail while light of at least 1,000 lux as the minimum requirement for human activity in the day time is maintained. Further, an effect of lowering the temperature in the membrane structure such as an agricultural greenhouse can be obtained.

Further, when the visible light transmittance of the resin film 10 with a coating layer is at most 75%, too much increase in the room temperature in the membrane structure can be prevented. A film having a visible light transmittance exceeding 75% has no substantial effect of improving thermal environment such as a decrease in the indoor temperature even though a design feature may be thereby imparted.

The visible light transmittance of the resin film 10 with a coating layer is measured in accordance with "Testing method on transmittance, reflectance and emittance of flat glasses and evaluation of solar heat gain coefficient" as stipulated by JIS R3106.

In a case where the coating layer 14 is formed on part of the surface of the resin film 12, the visible light transmittance of the resin film 10 with a coating layer is determined from the following formula.

Visible light transmittance of a resin film with a coating layer=(visible light transmittance at a portion on which the coating layer is formed)×(area ratio of the part on which the coating layer is formed)+(visible light transmittance at a portion on which no coating layer is formed)×(area ratio of the portion on which no coating layer is formed)

For example, in a case where a coating layer 14 is formed on 50% of the surface area of a resin film 12 made of a fluororesin having a visible light transmittance of 90% and the visible light transmittance at a portion on which the coating layer 14 is formed was 50%, the visible light transmittance of the entire resin film 10 with a coating layer is calculated to be 70%.

The visible light transmittance of the resin film 10 with a coating layer can be optionally set by properly setting the amount of the pigment (including the composite particles) in the coating layer 14, the thickness of the coating layer 14, the area of the coating layer 14, etc.

In the above-described composite particles of the present invention, since the particle containing titanium oxide is covered with the first covering layer containing cerium oxide which is excellent in ultraviolet shielding performance, discoloration, decomposition and photocatalytic reaction of titanium oxide by ultraviolet rays can be suppressed. Further, since the first covering layer is covered with the second covering layer containing silicon oxide having relatively high resistance against hydrogen fluoride, the reaction of hydrogen fluoride with cerium oxide can be suppressed. As a result, the decrease in ultraviolet shielding performance of the first covering layer is suppressed for a long time, and photocatalytic reaction is suppressed for a long time. Further, since the first covering layer is covered with the second covering layer containing silicon oxide, yellowness of cerium oxide is weakened, whereby the color intrinsic to the particles containing titanium oxide used as the core can be reproduced.

Further, the above-described printing ink of the present invention contains the composite particles of the present invention of which discoloration, decomposition and photocatalytic reaction by ultraviolet rays are suppressed and which are excellent in resistance against hydrogen fluoride. Accordingly, the printing ink of the present invention, even though it contains titanium oxide, can form a coating layer of which discoloration, a change in the visible light transmittance and a decrease in the mechanical strength are suppressed for a long time can be formed, and discoloration of the resin film itself, a change in the visible light transmittance and a decrease in the mechanical strength can be suppressed for a long time.

Further, in the above-described resin film with a coating layer of the present invention, the coating layer is formed from the printing ink containing the composite particles of the present invention. Accordingly, even though the coating layer contains titanium oxide, of the resin film with a coating layer of the present invention, discoloration, a change in the visible light transmittance and a decrease in the mechanical strength can be suppressed for a long time.

With respect to a conventional resin with a coating layer, in the case of back printing exposure (For example, FIG. 2) in which light enters from the resin film 12 side, light directly strikes the interface between the coating layer 14 and the resin film 12, whereby the coating layer 14 and the resin film 12 may be separated in some cases due to a decrease in adhesion at the interface in addition to deterioration of the coating layer 14 such as cracking. Further, if the resin binder is decomposed by photocatalytic reaction of titanium oxide, the dispersion state of the particles containing titanium oxide in the coating layer 14 is changed, and the particles containing titanium oxide agglomerate, whereby such a phenomenon is observed that the visible light reflectance increases and the visible light transmittance decreases. In such a case, the resin binder constituting the coating layer 14 is decomposed, and accordingly in a cellophane-tape peeling test, cohesive failure easily occurs. Further, decomposition of the resin film 12 itself occurs by photocatalytic reaction of titanium oxide, whereby mechanical strength of the resin film 12 is remarkably decreased in some cases.

On the other hand, in the case of top printing exposure (for example, FIG. 1) wherein light enters from the coating layer 14 side, deterioration starts from the surface layer of the coating layer 14. If the surface layer of the coating layer 14 becomes fragile, cohesive failure of the coating layer 14 occurs in the cellophane-tape peeling test, but the particles containing titanium oxide contained in the coating layer 14 shutoff ultraviolet rays to a certain extent, and accordingly it takes a long time until deterioration proceeds to the interface between the coating layer 14 and the resin film 12, and separation of the coating layer 14 and the resin film 12 is less likely to occur. Further, photocatalytic reaction is less likely to influence over the resin film 12 itself, and mechanical strength of the resin film 12 is less likely to decrease. As described above, the coating layer is required to have higher durability in the case of back printing as compared with the case of top printing. Accordingly, composite particles used for back printing are required to have higher performance. The composite particles having higher performance are preferably composite particles in which the amount of cerium oxide in the composite particles is in a higher range in the above range. That is, preferred are composite particles in which the amount of cerium oxide is from 5 to 30 parts by mass based on 100 parts by mass of titanium oxide. With the composite particles in which the amount of cerium oxide is within this range, the decrease in mechanical strength of the resin film by photocatalytic reaction is less likely to occur even in the case of back printing exposure. Accordingly, with such composite particles, a favorable coating layer can be formed without distinguishing the printing ink for back printing from the printing ink for top printing.

<Coating Composition>

As described above, in a case of forming a coating layer by using the composition for forming a coating layer of the present invention by a coating method, this composition for forming a coating layer is referred to as a coating composition. The coating method is a method of forming a coating layer on the entire surface of the aimed surface of a substrate, but as described above, the coating method is not limited thereto. The material, the shape and the like of the substrate to be coated are not limited. For example, the substrate is not limited to the above-mentioned material (e.g. a fluororesin)

mentioned as the printing substrate, but a synthetic resin material or a natural resin material, or an inorganic material such as a metal, glass, a ceramic or inorganic cement may be used as the substrate. The shape is not limited to a film or a sheet. Further, the substrate may have or may not have visible light transmittance. With the coating composition of the present invention, a coating layer can be formed on the desired portion of the substrate surface by a common coating method.

The coating composition of the present invention is a composition containing the composite particles, a resin binder and a liquid medium, and the resin binder and the liquid medium may be the same as in the case of the printing ink. Further, in some cases, water may be used as the liquid medium. The resin binder is, as described above, preferably a fluororesin, an acrylic polyol, an acrylic resin, an acrylic silicone or the like, more preferably a fluororesin in view of high weather resistance.

Now, the fluororesin binder will be described in further detail below. The following fluororesin binder is basically the same as the fluororesin binder in the above printing ink. However, in the case of the printing ink, it is not required to use a curing agent in combination, but in the case of a coating composition, usually a curing agent is used in combination. This is because usually a curing agent is required to sufficiently cure a relatively thick layer, since the coating layer formed by the coating method is thick as compared with a coating film formed by the printing method in many cases.

The fluororesin binder is preferably a combination of a solvent-soluble or water dispersible fluoropolymer which is known as a fluororesin for a coating composition with a curing agent. Such a fluoropolymer is preferably a polymer which is a copolymer of a fluoroolefin with a hydrocarbon monomer and which has a moiety susceptible to curing reaction. The moiety susceptible to curing reaction is introduced by using a monomer having a moiety susceptible to curing reaction as part of the hydrocarbon monomer.

The fluoroolefin is preferably a fluoroolefin such as tetrafluoroethylene, chlorotrifluoroethylene, vinylidene fluoride or perfluoropropyl vinyl ether, particularly preferably tetrafluoroethylene or chlorotrifluoroethylene.

The hydrocarbon monomer is preferably an alkenyl ether monomer such as a vinyl ether, an allyl ether or an isopropenyl ether or an alkenyl ester monomer such as a vinyl carboxylate, an allyl carboxylate or an unsaturated carboxylate. Particularly, the hydrocarbon monomer is preferably one or more types of vinyl ethers or a combination of at least one vinyl ether and at least one another hydrocarbon monomer (particularly preferred is a vinyl carboxylate). The vinyl ether may, for example, be an alkyl vinyl ether such as ethyl vinyl ether or butyl vinyl ether, a cycloalkyl vinyl ether such as cyclohexyl vinyl ether or a hydroxyalkyl vinyl ether. The vinyl carboxylate may, for example, be vinyl acetate or vinyl pivalate.

The ratio of fluoroolefin units base on the total repeating units in the copolymer of the fluoroolefin with the hydrocarbon monomer is preferably from 30 to 70 mol %, particularly preferably from 40 to 60 mol %.

The moiety susceptible to curing reaction in the fluoropolymer is preferably a hydroxyl group, a carboxyl group or an epoxy group. Further, it may be a moiety susceptible to curing reaction formed by introducing another functional group employing such a functional group in the fluoropolymer as the base. Further, the fluoropolymer may have two or more types of functional groups, and for example, a fluoropolymer having hydroxyl groups and carboxyl groups may be used. Functional groups such as hydroxyl groups, carboxyl groups or epoxy groups can be obtained by copolymerizing a hydrocarbon monomer having such a functional group. The hydrocarbon monomer having such a functional group may, for example, be 4-hydroxybutyl vinyl ether, glycidyl vinyl ether or glycidyl vinyl ester. A particularly preferred fluoropolymer is a hydroxyl group-containing fluoropolymer. Its hydroxyl value is preferably from 10 to 150 mgKOH/g polymer.

The fluoropolymer having the above moiety susceptible to curing reaction is preferably used in combination with a curing agent. The curing agent can be properly selected from known curing agents for a coating composition such as an isocyanate curing agent, a blocked isocyanate curing agent, an aminoplast curing agent, a polyvalent carboxylic acid curing agent and a polyvalent amine curing agent. The curing agent is selected preferably considering the type of the moiety susceptible to curing reaction which the fluoropolymer has, the curing characteristics, etc. Particularly as the curing agent for a hydroxyl group-containing fluoropolymer, it is preferred to use an isocyanate curing agent, a blocked isocyanate curing agent or an aminoplast curing agent.

In the case of using a curing agent which undergoes curing reaction at room temperature, preferred is a two-pack curable coating composition such that a chief agent containing the hydroxyl group-containing fluoropolymer and a curing agent are separately prepared and they are mixed at the time of forming a coating layer. The other components which are not reactive with the hydroxyl group-containing polymer are preferably contained in the chief agent. With the two-pack curable coating composition, a coating composition having the chief agent and the curing agent mixed is applied to a substrate and dried at room temperature to form a coating layer on the substrate.

Further, in the case of using a curing agent which undergoes curing reaction by heating, the curing agent and the hydroxyl group-containing fluoropolymer can coexist in the coating composition, whereby a one-pack type baking coating composition can be used. In such a case, the coating composition is applied to a substrate and baked to form a coating layer on the substrate.

The curing agent which undergoes curing reaction at room temperature may, for example, be a polyvalent isocyanate curing agent such as a non-yellowing hexamethylene diisocyanate or isophorone diisocyanate, or an addition product thereof or a multimer thereof.

The curing agent which undergoes curing reaction by heating may, for example, be a blocked isocyanate curing agent or an aminoplast curing agent. Particularly, a polyisocyanate curing agent containing isocyanate groups is useful. In this case, it is preferred to accelerate curing by addition of a curing catalyst such as dibutyltin dilaurate.

With respect to the amount of use of the curing agent, no sufficient curing properties will be obtained if it is too small, and a too large amount is unfavorable in view of durability of the coating layer since a large number of unreacted portions of the curing agent will be left. The amount of use of the curing agent can be properly set so as not to create such inconvenience, and it is, for example, preferably from 0.1 to 200 parts by mass, more preferably from 1 to 100 parts by mass, based on 100 parts by mass of the hydroxyl group-containing fluoropolymer.

Particularly, the molar ratio (NCO)/(OH) of NCO present in the curing agent to OH supplied from the hydroxyl group-containing fluoropolymer is preferably at least 0.5 and at most 3.0. If (NCO)/(OH) is at least 0.5, sufficient curing properties are likely to obtained, and when it is at most 3.0, the decrease in durability of a coating layer derived from unreacted NCO groups is likely to be prevented. In a case where no curing agent is used, such a composition may be used as a one-pack lacquer type coating composition.

The preparation of the coating composition of the present invention is, for example, carried out as follows.

The coating composition of the present invention preferably contains the composite particles of the present invention in an amount of from 10 to 50 mass % based on 100 mass % of the entire coating composition. If the content is less than 10 mass %, shielding properties tend to be insufficient, whereby the influence of the color of the substrate tends to be significant in many cases. Further, if the content exceeds 50 mass %, the viscosity at the time of coating tends to be too high, whereby no coating layer with a uniform thickness is likely to be formed. The content of the composite particles is particularly preferably from 15 to 30 mass %.

Further, the coating composition of the present invention contains a resin solid content in an amount of preferably from 5 to 60 mass % based on 100 mass % of the entire coating composition. If the content is less than 10 mass %, a coating layer of at least 5 μm as the thickness after drying is heardly obtained, and if it exceeds 60 mass %, the viscosity at the time of coating tends to be too high, whereby no coating layer with a uniform thickness is likely to be formed. The content of the resin solid content is particularly preferably from 15 to 40 mass %.

Further, the amount of the composite particles of the present invention is preferably from 10 to 200 parts by mass, more preferably from 30 to 150 parts by mass per 100 parts by mass of the resin binder.

The coating composition may contain another pigment except for the composite particles of the present invention. Such another pigment may, for example, be a coloring pigment such as an organic pigment or an inorganic pigment, and specifically, it may, for example, be carbon black (black pigment), iron oxide (red pigment), aluminum cobalt oxide (blue pigment), copper phthalocyanine (blue pigment, green pigment), perylene (red pigment) or bismuth vanadata (yellow pigment).

The total amount of the composite particles of the present invention and another pigment is preferably from 10 to 200 parts by mass, more preferably from 30 to 150 parts by mass based on 100 parts by mass of the resin binder.

<Coated Article>

According to the present invention, an article having on its surface a coating layer formed by using the coating composition of the present invention, is obtained. That is, a coating layer can be formed by applying the coating composition to the surface of an article. In a case where the coating composition contains a liquid medium, it is dried after application to remove the liquid medium. It may be dried by heating as the case requires. Further, baking for curing may be carried out as the case requires.

The coating composition may be applied by a known method. For example, brush coating, roller coating, and coating with a wiper or a squeegee, roll coating, dip coating, coating by a printing method, bar coating, curtain flow, dye coating, flow coating, spray coating or sponge coating may, for example, be mentioned. Particularly in the case of field application, preferred is sponge coating since non-uniformity of the coating layer is less likely to occur, and coating corresponding to the size of a portion to be coated is likely to be properly carried out.

Further, for the purpose of increasing mechanical strength of the coating layer, after the coating composition is applied, heating, irradiation with ultraviolet rays, irradiation with electron rays, or the like may properly be carried out within an acceptable range in view of process steps. The heating temperature is set considering heat resistance of the article to be coated.

The layer thickness of the coating layer is preferably from 10 to 1,000 μm. A layer thickness at a minimum of 10 μm is required since if physical destruction of the coating layer such as abrasion or dent of the coating layer by collision of sand, stones or the like in outdoor use is in progress, acid rain or ozone gas may penetrate through the coating layer to denature to the substrate. Further, if the layer thickness exceeds 1,000 μm, drying of the coating layer tends to be non-uniform, and no dense coating layer will be obtained, whereby the cohesive force of the coating layer tends to be insufficient. The layer thickness is more preferably from 30 to 300 μm.

The coating composition of the present invention is particularly preferably applied to an outdoor article. The outdoor articles may, for example, be transportation instruments such as automobiles, electric cars, helicopters, ships, bicycles, snow vehicles, ropeways, lifts, hovercrafts or motor cycles; building materials such as sashes, shutters, storage tanks, doors, balconies, exterior walls of buildings building external panels, roof materials, stairs, skylights or concrete fences, road materials such as guard rails, pedestrian walkways, sound insulating walls, signs, express way side walls, elevated railroad tracks or bridges; plant installations such as tanks, pipes, towers or chimneys; agricultural installations such as vinyl houses, green houses, silos or agricultural sheets; communication installations such as power poles, power transmission towers or parabola antennas; electric instruments such as electric wiring boxes, light equipments, air conditioners or washing machines; monuments, gravestones, paving materials, wind-proof sheets, water-proof sheets, or curing sheets for construction. By forming a coating layer on part of or on the entire surface of such an outdoor article using the coating composition of the present invention, durability and weather resistance (particularly resistance against acid rain) can be imparted when the coating layer surface is exposed to rain, snow or direct sunlight for a long time.

The above-described coating composition of the present invention comprises the composite particles of the present invention of which discoloration, decomposition and photocatalytic reaction by ultraviolet rays are suppressed and which is excellent in resistance against an acidic decomposed product such as hydrogen fluoride. Accordingly, with the coating composition of the present invention, although it contains titanium oxide, a coating layer can be formed of which discoloration and decrease in brightness of the coating layer when exposed to the outdoors can be suppressed for a long time.

EXAMPLES

Now, the present invention will be described in further detail with reference to Examples. However, it should be understood that the present invention is by no means restricted thereto.

(Contents of Titanium Oxide, Cerium Oxide and Silicon Oxide)

The contents of titanium oxide, cerium oxide and silicon oxide were determined by using SEM-EDX integration system S-3400NX manufactured by Hitachi, Ltd.

(Average Particle Size of Composite Particles)

The obtained composite particles were put in isopropanol to a solid content concentration of about 0.1 mass %, and then the composite particles were completely dispersed by ultrasonic waves. Then, the dispersion was dropped on a collodion film and dried, whereupon the SEM observation was carried out using a scanning electron microscope (SEM-EDX integration system S-3400NX manufactured by Hitachi, Ltd.). The average of diameters of 20 particles randomly selected in the obtained SEM image was regarded as the average particle size.

(Visible Light Transmittance)

The visible light transmittance of the resin film with a coating layer was measured using a spectrophotometer (UV-3100PC manufactured by Shimadzu Corporation) in accordance with "Testing method on transmittance, reflectance and emittance of flat glasses and evaluation of solar heat gain coefficient" as stipulated in JIS R3106.

(60° Gloss)

The 60° gloss of the coated article was measured by using a spectrophotometer (CM2500D, manufactured by KONICA MINOLTA HOLDINGS, INC) in accordance with JIS Z8722.

(Accelerated Weathering Test)

An accelerated weathering test for 5,000 hours was carried out by using a sunshine weather meter (300 Sunshine weather meter manufactured by Suga Test Instruments Co., Ltd.) equipped with an open frame carbon arc lamp in compliance with JIS K7350-4.

1. In the Case of a Resin Film with a Coating Layer

The accelerated weathering test was carried out with respect to top printing exposure in which light enters from the coating layer side and back printing exposure in which light enters from the resin film side. After the accelerated weathering test, the visible light transmittance of the resin film with a coating layer was measured.

The change in the visible light transmittance of the resin film with a coating layer as between before and after the accelerated weathering test also indicates discoloration of the resin film with a coating layer.

2. In the Case of a Coated Article

The 60° gloss of the coated article was measured after the accelerated weathering test.

(Peel Strength Test)

After the accelerated weathering test, a cellophane tape was bonded to the coating layer and peeled, whereupon the state of the coating layer was visually confirmed and evaluated on the basis of the following standard.

○: No peeling of the coating layer observed.

X: Peeling of the coating layer observed.

The presence or absence of peeling of the coating layer also indicates the mechanical strength of the resin film with a coating layer.

(Color Difference)

The values L, a and b of the coated article were measured in accordance with JIS Z-8741 before and after the accelerated weathering test to determine the color difference ΔE as between before and after the test.

Example 1

Preparation of Composite Particles 500 g of a titanium oxide pigment (manufactured by Ishihara Sangyo Kaisha, Ltd., CR50, average particle size: 0.20 μm) was added to 10 liters of pure water and dispersed by a Disperse Mill (manufactured by Hosokawa Micron Corporation) for 1 hour to obtain an aqueous dispersion. While the aqueous dispersion was heated at 80° C. and stirred, 264 g of an aqueous cerium nitrate solution (cerium content: 10 mass % as calculated as $CeO_2$) was dropwise added to the aqueous dispersion. A sodium hydroxide solution (5 mass % aqueous solution) was added to the aqueous solution to neutralize the dispersion to have a pH of from 7 to 9 so that cerium hydroxide was deposited on the surface of the titanium oxide pigment. The liquid containing the particles covered with cerium hydroxide was subjected to filtration, and the obtained particles covered with cerium hydroxide were washed with water and dried. Agglomerates of the particles covered with cerium hydroxide were ground to obtain particles covered with cerium hydroxide.

The particles covered with cerium hydroxide were added to 10 liters of pure water and dispersed by a Disperse Mill for 1 hour to obtain an aqueous dispersion. While the aqueous dispersion was heated at 80° C. and stirred, 348 g of No. 3 sodium silicate (silicon content: 28.5 mass % as calculated as $SiO_2$) was added to the aqueous dispersion. On that occasion, diluted sulfuric acid (2N aqueous solution) was also added to keep the pH of the liquid to from 9 to 11, and stirring was continued further for 1 hour. Then, diluted sulfuric acid (2N aqueous solution) was added to adjust the liquid to have a pH of from 6 to 8 to form a second covering layer on the particle covered with cerium hydroxide. The liquid containing precursor particles was subjected to filtration, and the obtained precursor particles were washed with water and dried. Agglomerates of the precursor particles were ground to obtain precursor particles.

The precursor particles were fired at a temperature of 500° C. for 2 hours, and agglomerates of the particles were ground by a hammer mill to obtain composite particles having an average particle size of 0.25 μm. In the composite particles, the content of titanium oxide was 72 mass %, the content of cerium oxide was 10 mass % and the content of silicon oxide was 18 mass %. Accordingly, the amount of cerium oxide was 13.9 parts by mass based on 100 parts by mass of titanium oxide, and the amount of silicon oxide was 25.0 parts by mass based on 100 parts by mass of titanium oxide.

Preparation of Printing Ink:

65 g of the composite particles were added to 100 g of a solution (manufactured by Asahi Glass Company, Limited, LUMIFLON 916N, solid content: 65 mass %, solvent: xylene) of a solvent-soluble fluororesin as a resin binder and dispersed by a ball mill to obtain a white liquid having a pigment concentration of 50 mass % in the solid content. The composition of the liquid is such that the liquid comprises 65 g of the resin, 65 g of the composite particles and 35 g of the solvent. Further, 80 g of a solvent mixture of toluene/methyl ethyl ketone=50/50 by mass ratio was added to adjust the viscosity thereby to obtain a printing ink.

Namely, based on 100 parts by mass in total of the printing ink, the printing ink comprises 27 parts by mass of the composite particles, 27 parts by mass of the fluororesin, 14 parts by mass of xylene, 16 parts by mass of toluene and 16 parts by mass of methyl ethyl ketone.

Preparation of Resin Film with a Coating Layer:

Corona discharge treatment was applied to an ETFE film having a thickness of 200 μm at a treatment density of 150 W·min/m² in the air. To the surface subjected to corona discharge treatment of the ETFE film, the above printing ink was applied by a gravure printing method so that the thickness after drying would be 1.5 μm, and the coating layer was dried at 100° C. for 60 seconds to obtain a resin film with a coating layer.

Figure 3:
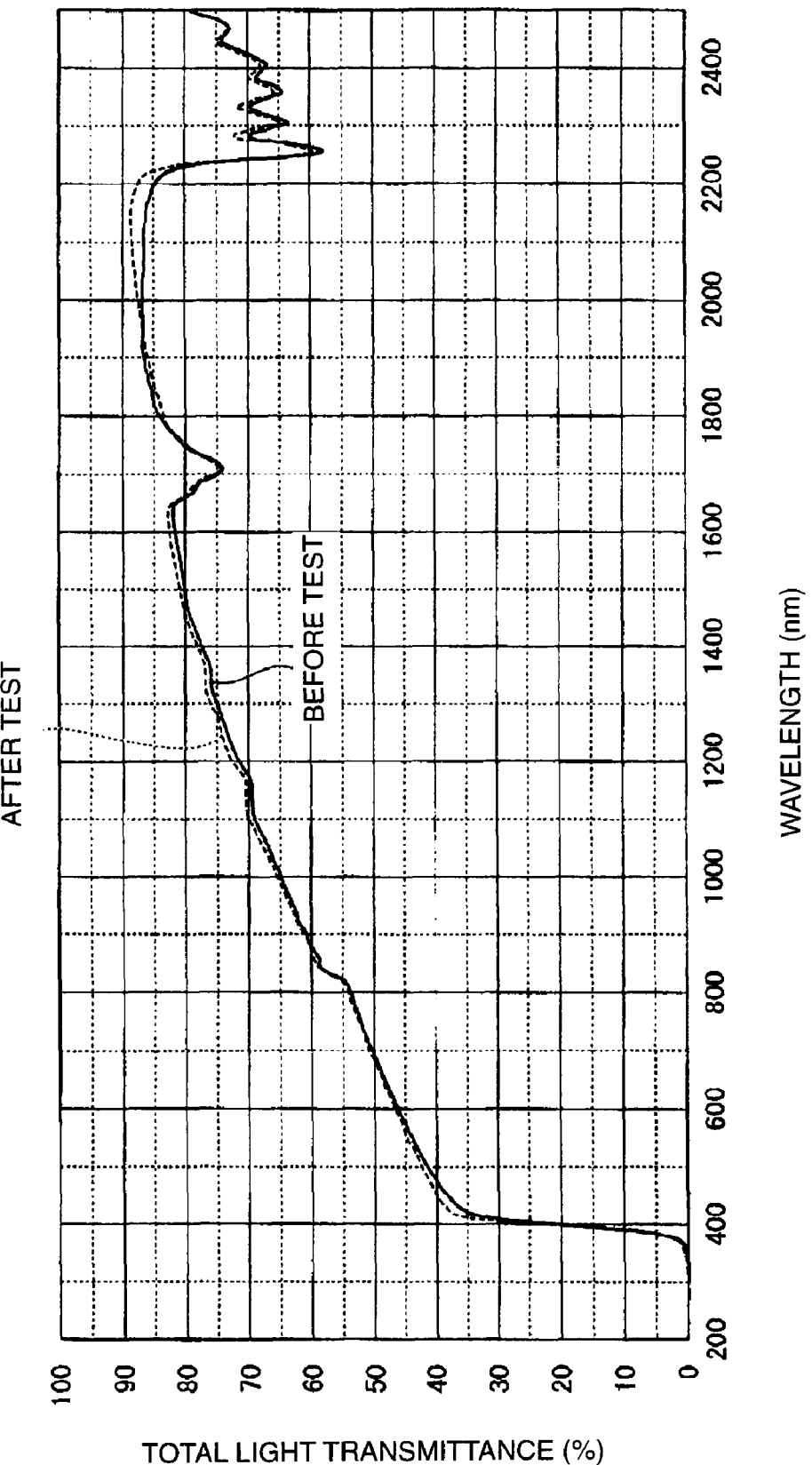
FIG. 3 illustrates an optical chart of the resin film with a coating layer in Example 1 before and after an accelerated weathering test by top printing exposure.
Figure 4:
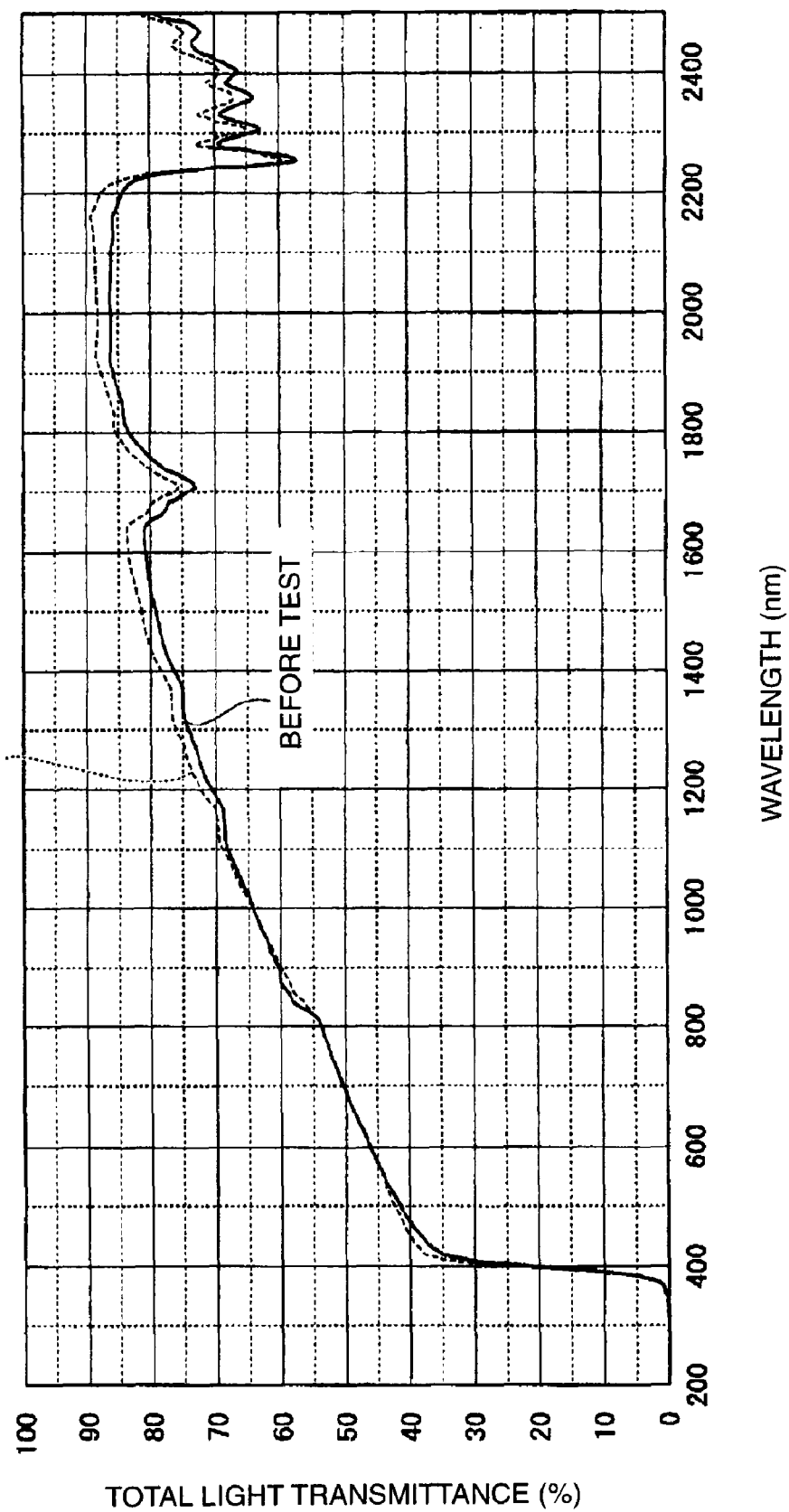
FIG. 4 illustrates an optical chart of the resin film with a coating layer in Example 1 before and after an accelerated weathering test by back printing exposure.

The visible light transmittances of the resin film with a coating layer before and after the accelerated weathering test were measured. The results are shown in Table 1. Further, an optical chart of the resin film with a coating layer before and after the accelerated weathering test by top printing exposure is shown in FIG. 3, and an optical chart of the resin film with a coating layer before and after the accelerated weathering test by back printing exposure is shown in FIG. 4. Further, the peel strength test was carried out. The results are shown in Table 1.

Examples 2 to 5

Composite particles as identified in Table 1 were obtained in the same manner as in Example 1 except that the amounts of materials charged were changed.

A printing ink was obtained in the same manner as in Example 1 except that the above composite particles were used.

A resin film with a coating layer was obtained in the same manner as in Example 1 except that the printing ink was used, and the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

Example 6

A printing ink was obtained in the same manner as in Example 1 except that the resin binder was changed to ea solution (manufactured by Taisei Fine Chemical Co., Ltd., Acrit QT507-28, solid content: 50 mass %, solvent: 25 mass % of toluene, butyl acetate: 25 mass %) of an acrylic polyol, and the amount of the composite particles was changed to 55 g. Namely, based on 100 parts by mass in total of the printing ink, the printing ink comprises 23 parts by mass of the composite particles, 21 parts by mass of the acrylic polyol resin, 28 parts by mass of toluene, 11 parts by mass of butyl acetate and 17 parts by mass of methyl ethyl ketone.

A resin film with a coating layer was obtained in the same manner as in Example 1 except that the printing ink was used and the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

Example 7

A printing ink was obtained in the same manner as in Example 1 except that the composite particles were changed to composite particles in Example 2, that the resin binder was changed to an acrylic polyol (manufactured by Taisei Fine Chemical Co., Ltd., Acrit QT507-28, solid content: 50 mass %, solvent: 25 mass % of toluene, butyl acetate: 25 mass %) and that the amount of the composite particles was changed to 55 g. That is, based on 100 parts by mass in total of the ink, the ink comprises 23 parts by mass of the composite particles, 21 parts by mass of the acrylic polyol resin, 28 parts by mass of toluene, 11 parts by mass of butyl acetate and 17 parts by mass of methyl ethyl ketone.

A resin film with a coating layer was obtained in the same manner as in Example 1 except that the printing ink was used and the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

Example 8

A resin film with a coating layer was obtained in the same manner as in Example 1 except that the resin film was changed to a PET film having a thickness of 100 μm and the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

Example 9

A printing ink was obtained in the same manner as in Example 1 except that a titanium oxide pigment (manufactured by Ishihara Sangyo Kaisha, Ltd., CR50, average particle size: 0.20 μm) was used instead of the composite particles.

A resin film with a coating layer was obtained in the same manner as in Example 1 except that the printing ink was used and the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

Figure 5:
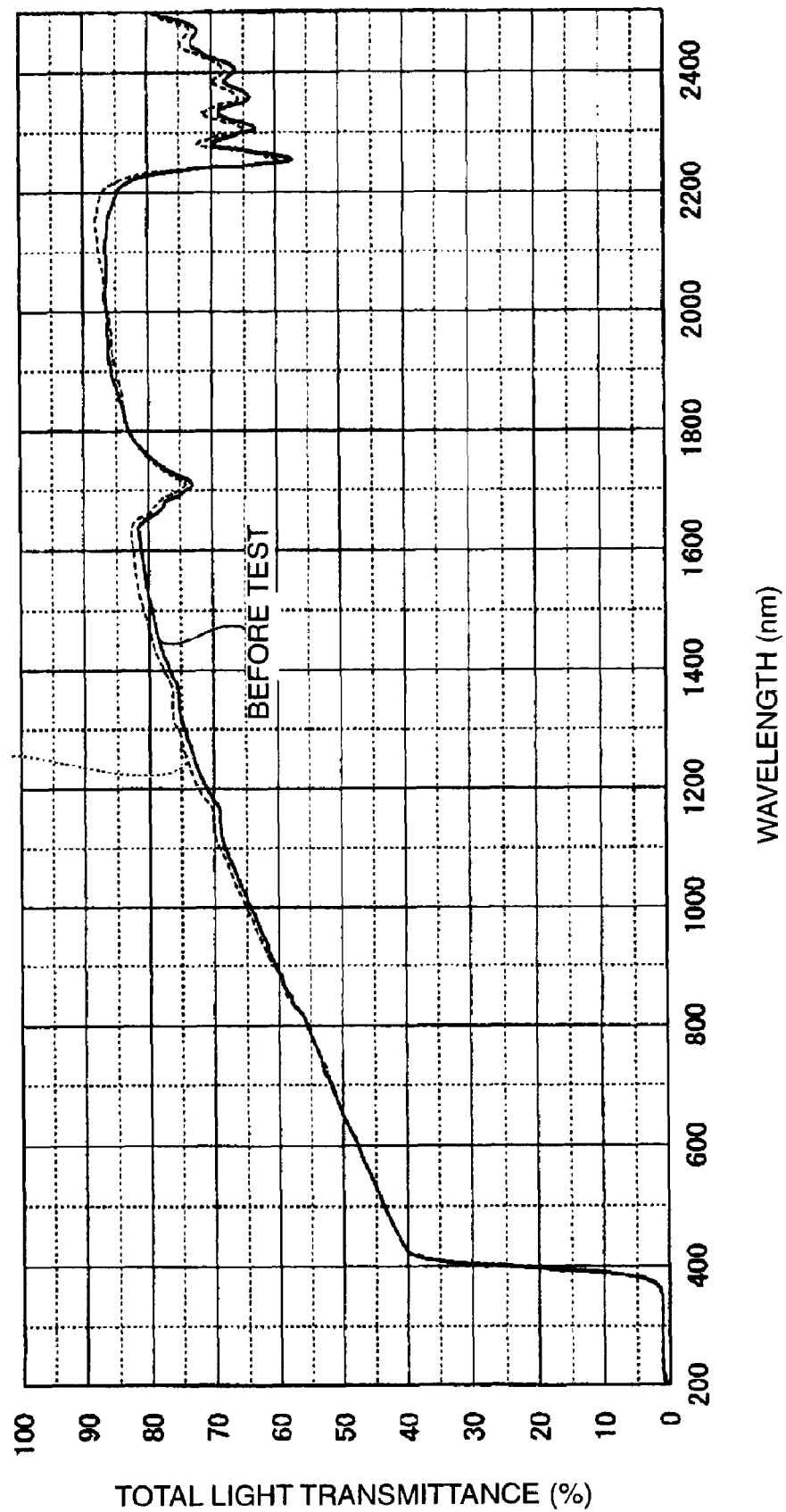
FIG. 5 illustrates an optical chart of the resin film with a coating layer in Example 9 before and after an accelerated weathering test by top printing exposure.
Figure 6:
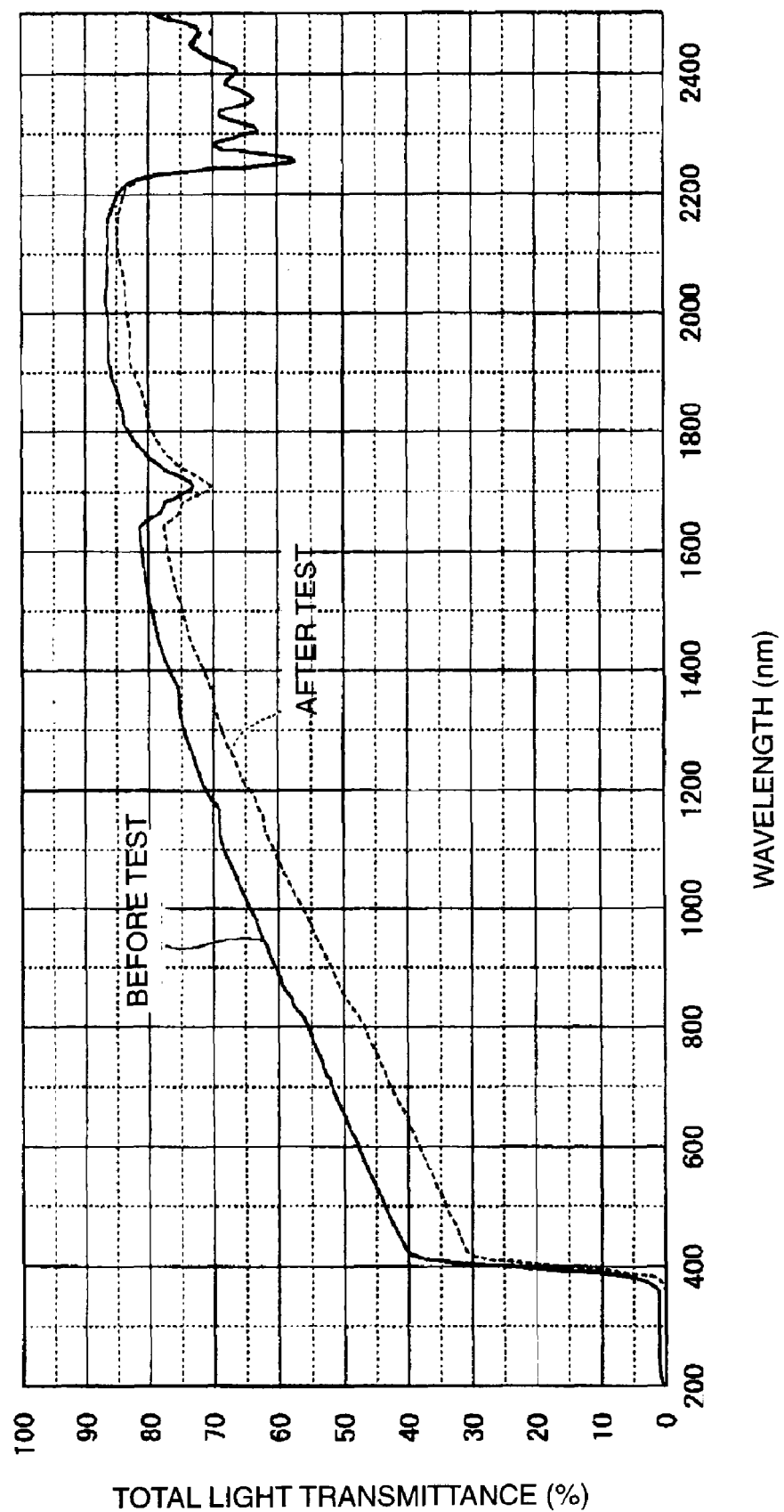
FIG. 6 illustrates an optical chart of the resin film with a coating layer in Example 9 before and after an accelerated weathering test by back printing exposure.

The visible light transmittances of the resin film with a coating layer before and after the accelerated weathering test were measured. The results are shown in Table 1. Further, an optical chart of the resin film with a coating layer before and after the accelerated weathering test by top printing exposure is shown in FIG. 5, and an optical chart of the resin film with a coating layer before and after the accelerated weathering test by back printing exposure is shown in FIG. 6. Further, the peel strength test was carried out. The results are shown in Table 1.

Examples 10 to 13

Composite particles as identified in Table 1 were obtained in the same manner as in Example 1 except that the amounts of materials charged were changed.

A printing ink was obtained in the same manner as in Example 1 except that the above composite particles were used.

A resin film with a coating layer was obtained in the same manner as in Example 1 except that the printing ink was used, and the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

Example 14

A printing ink was obtained in the same manner as in Example 1 except that 55 g of a titanium oxide pigment (manufactured by Ishihara Sangyo Kaisha, Ltd., CR50, average particle size: 0.20 μm) was used instead of 65 g of the composite particles and that the resin binder was changed to an acrylic polyol (manufactured by Taisei Fine Chemical Co., Ltd., Acrit QT507-28, solid content: 50 mass %, solvent: toluene 25 mass %, butyl acetate: 25 mass %). That is, based on 100 parts by mass in total of the ink, the ink comprises 23 parts by mass of the composite particles, 21 parts by mass of the acrylic polyol resin, 28 parts by mass of toluene, 11 parts by mass of butyl acetate and 17 parts by mass of methyl ethyl ketone.

A resin film with a coating layer was obtained in the same manner as in Example 1 except that the printing ink was used.

The visible light transmittances of the resin film with a coating layer before and after the accelerated weathering test were measured. The results are shown in Table 1. Further, the peel strength test was carried out. The results are shown in Table 1.

Example 15

A resin film with a coating layer was obtained in the same manner as in Example 1 except that a titanium oxide pigment (manufactured by Ishihara Sangyo Kaisha, Ltd., CR50, average particle size: 0.20 μm) was used instead of the composite particles, that the resin film was changed to a PET film having a thickness of 100 μm and that the thickness of the coating layer was changed to the thickness as identified in Table 1.

The visible light transmittances of the resin film with a coating layer before and after the accelerated weathering test were measured. The results are shown in Table 1. Further, the peel strength test was carried out. The results are shown in Table 1.

With respect to some resin films with a coating layer, the visible light transmittance increased by 1% at the maximum, and the reasons are considered to be as follows.

Transparency (visible light transmittance) of a resin film is determined by crystallinity and the size of crystals of the resin. The higher the crystallinity and the larger the crystal size, the more the transparency decrease and the lower the visible light transmittance decreases. With respect to ETFE, after subjected to the weathering test, although the crystallinity increases, the crystal size is reduced, the visible light transmittance increases by so small as within 1% though, and the haze tends to decrease. Accordingly, by the method of measuring optical characteristics of the printing ink printed on an ETFE film, an increase in the visible light transmittance by about 1% and a decrease in the haze may be influenced by changes of the ETFE film.

On the other hand, the sunshine weather meter is an apparatus of irradiating light generated by burning carbon. Accordingly, the interior of the apparatus is soiled with "soot" of carbon, and accordingly it is difficult to judge whether the decrease in the visible light transmittance by about 1% is due to the soiling in the apparatus or a change in optical characteristics of the coating layer.

Accordingly, it is appropriate to judge that the coating layer of the printing ink does not substantially change if the change in the visible light transmittance and the haze is about 1%.

The resin film with a coating layer in Example 9 is an example using a titanium oxide pigment without first covering layer and second covering layer.

The change in the visible light transmittance as between before and after the accelerated weathering test by back print-

TABLE 1

|  | Composite particles | | | | | | Average particle size μm | Coating layer | | Accelerated weathering test | | | | | |
|---|---|---|---|---|---|---|---|---|---|---|---|---|---|---|---|
|  | | | | | | | | | | Back printing exposure | | | Top printing exposure | | |
|  | | | | | | | | | | Transmittance (%) | | | Transmittance (%) | | |
|  | mass % | | | Parts by mass | | | | Resin binder | | Before test | After test | Peel strength test | Before test | After test | Peel strength test |
|  | CeO$_2$ | SiO$_2$ | TiO$_2$ | CeO$_2$ | SiO$_2$ | TiO$_2$ | | | Resin Thickness (μm) film | | | | | | |
| Ex. 1 | 10 | 18 | 72 | 13.9 | 25.0 | 100.0 | 0.25 | F | 1.5 ETFE | 44.2 | 44.4 | ○ | 44.2 | 44.9 | ○ |
| Ex. 2 | 5 | 18 | 77 | 6.5 | 23.4 | 100.0 | 0.22 | F | 1.3 ETFE | 44.5 | 44.6 | ○ | 43.6 | 44.2 | ○ |
| Ex. 3 | 17.5 | 16.5 | 66 | 26.5 | 25.0 | 100.0 | 1.90 | F | 2 ETFE | 50.5 | 50.9 | ○ | 50.8 | 51.0 | ○ |
| Ex. 4 | 11.5 | 7 | 81.5 | 14.1 | 8.6 | 100.0 | 0.23 | F | 2.5 ETFE | 31 | 32 | ○ | 32.0 | 32.0 | ○ |
| Ex. 5 | 12 | 30 | 55 | 21.8 | 54.5 | 100.0 | 1.00 | F | 1 ETFE | 60 | 61 | ○ | 60.0 | 61.0 | ○ |
| Ex. 6 | 10 | 18 | 72 | 13.9 | 25.0 | 100.0 | 0.25 | A | 1.2 ETFE | 42.2 | 42.3 | ○ | 42.2 | 42.1 | ○ |
| Ex. 7 | 5 | 18 | 77 | 6.5 | 23.4 | 100.0 | 0.22 | A | 1 ETFE | 42.5 | 42.3 | ○ | 42.2 | 41.2 | ○ |
| Ex. 8 | 10 | 18 | 72 | 13.9 | 25.0 | 100.0 | 0.25 | F | 2.5 PET | 30.5 | 30.1 | ○ | 31.2 | 31.9 | ○ |
| Ex. 9 | 0 | 0 | 100 | 0.0 | 0.0 | 100.0 | 0.20 | F | 1.1 ETFE | 46 | 36.5 | X | 45.9 | 46.0 | X |
| Ex. 10 | 2.5 | 19.5 | 78 | 3.2 | 25.0 | 100.0 | 0.25 | F | 2 ETFE | 30 | 31.1 | X | 32.0 | 31.0 | ○ |
| Ex. 11 | 22.5 | 15.5 | 62 | 36.3 | 25.0 | 100.0 | 2.00 | F | 2.2 ETFE | 38.6 | 32.6 | X | 39.6 | 39.4 | ○ |
| Ex. 12 | 12 | 3 | 85 | 14.1 | 3.5 | 100.0 | 0.26 | F | 2 ETFE | 32 | 25 | ○ | 32.0 | 30.0 | ○ |
| Ex. 13 | 12 | 38 | 50 | 24.0 | 76.0 | 100.0 | 3.40 | F | 4 ETFE | 40 | 32 | X | 40.0 | 41.1 | ○ |
| Ex. 14 | 0 | 0 | 100 | 0.0 | 0.0 | 100.0 | 0.20 | A | 1.5 ETFE | 31 | 25 | X | 31.2 | 30.0 | X |
| Ex. 15 | 0 | 0 | 100 | 0.0 | 0.0 | 100.0 | 0.20 | F | 2 PET | 32 | 28.5 | X | 31.2 | 31.2 | ○ |

F: fluororesin,
A: acrylic polyol,
transmittance: visible light transmittance

With respect to resin films with a coating layer in Examples 1 to 8, the change in the visible light transmittance of the resin film with a coating layer as between before and after the accelerated weathering test was small, and the coating layer was not peeled in the peel strength test.

ing exposure was significant. The coating layer after the accelerated weathering test by back printing exposure was deteriorated to such an extent that it had countless cracklings and peeling occurred only by bending the film. Further, on the resin film surface after peeling, fine irregularities are generated only on the portion on which the coating layer was formed, and it is considered that not only the fluororesin in the printing ink but also the fluororesin in the resin film underwent photodecomposition.

The change in the visible light transmittance as between before and after the accelerated weathering test by top printing exposure was small, that in the peel strength test after the accelerated weathering test, cohesive failure of the coating layer occurred.

The resin Film with a coating layer in Example 10 is an example wherein composite particles with a small amount of cerium oxide were used. Although the change in the visible light transmittance as between before and after the accelerated weathering test by back printing exposure was small, peeling of the coating layer occurred in the peel strength test after the accelerated weathering test. It is possible to use the resin film with a coating layer for top printing exposure.

The resin film with a coating layer in Example 11 is an example wherein the composite particles with a large amount of cerium oxide were used. The change in the visible light transmittance as between before and after the accelerated weathering test by back printing exposure was significant, and peeling of the coating layer occurred in the peel strength test after the accelerated weathering test. It is considered that the first covering layer and the second covering layer fell off since the amount of cerium oxide was large.

The resin film with a coating layer in Example 12 is an example wherein composite particles with a small amount of silicon oxide were used. The change in the visible light transmittance as between before and after the accelerated weathering test by back printing exposure was significant.

The resin film with a coating layer in Example 13 is an example wherein composite particles with a large amount of silicon oxide were used. The change in the visible light transmittance as between before and after the accelerated weathering test by back printing exposure was significant, and peeling of the coating layer occurred in the peel strength test after the accelerated weathering test. It is considered that the second covering layer fell off since the amount of silicon oxide was large.

The resin film with a coating layer in Example 14 is an example wherein a titanium oxide pigment having no first covering layer and second covering layer was used, and the resin binder was not a fluororesin. The change in the visible light transmittance as between before and after the accelerated weathering test by back printing exposure was significant, and peeling of the coating layer occurred in the peel strength test after the accelerated weathering test. The change in the visible light transmittance as between before and after the accelerated weathering test by top printing exposure was small, but cohesive failure of the coating layer occurred in the peel strength test after the accelerated weathering test.

The resin film with a coating layer in Example 15 is an example wherein a titanium oxide pigment having no first covering layer and second covering layer was used, and the resin film was not a fluororesin. The change in the visible light transmittance as between before and after the accelerated weathering test by back printing exposure was significant, and peeling of the coating layer occurred in the peel strength test after the accelerated weathering test.

Example 16

Preparation of Coating Composition 65 g of the composite particles obtained in Example 1 were added to 100 g of a solution (manufactured by Asahi Glass Company, Limited, LUMIFLON 916N, solid content: 65 mass %, solvent: xylene) of a solvent-soluble fluororesin as the resin binder and dispersed by a ball mill to obtain a liquid having a pigment concentration of 50 mass % in the solid content. As the composition of the liquid, the liquid comprises 65 g of the resin, 65 g of the composite particles and 35 g of the solvent. Further, so as to adjust the viscosity, 80 g of a mixed solvent of toluene/methyl ethyl ketone=50/50 mass ratio was added to obtain a chief agent.

Based on 100 parts by mass in total of the chief agent, the chief agent comprises 27 parts by mass of the composite particles, 27 parts by mass of the fluororesin, 14 parts by mass of xylene, 16 parts by mass of toluene and 16 parts by mass of methyl ethyl ketone.

To 100 g of the chief agent, 12.7 parts by mass of a polyvalent isocyanate compound (manufactured by Nippon Polyurethane Industry Co., Ltd., Coronate-HX) as the curing agent was added to obtain a coating composition.

Production of Coated Article:

The coating composition was applied to an aluminum plate having a thickness of 2 mm by a Baker applicator Do that the thickness after drying would be about 50 μm and cured at 20° C. for 7 days to obtain a coated article.

The 60° gloss of the coated article before and after the accelerated weathering test was measured. The results are shown in Table 2. Further, the color difference ΔE as between before and after the accelerated weathering test was obtained. The results are shown in Table 2.

Examples 17 to 20

Composite particles as identified in Table 2 were obtained in the same manner as in Example 1 except that the amount of materials charged were changed.

A coating composition was obtained in the same manner as in Example 16 except that the composite particles were used.

A coated article was obtained in the same manner as in Example 16 using the coating composition.

The 60° glosses of the coated article before and after the accelerated weathering test were measured. The results are shown in Table 2. Further, the color difference ΔE as between before and after the accelerated weathering test was obtained. The results are shown in Table 2.

Example 21

A chief agent was obtained in the same manner as in Example 16 except that the resin binder was changed to a solution (manufactured by Taisei Fine Chemical Co., Ltd., Acrit QT507-28, solid content: 50 mass %, solvent: toluene 25 mass %, butyl acetate: 25 mass %) of an acrylic polyol and that the amount of the composite particles was changed to 55 g. Based on 100 parts by mass in total of the chief agent, the chief agent comprised 23 parts by mass of the composite particles, 21 parts by mass of the acrylic polyol resin, 28 parts by mass of toluene, 11 parts by mass of butyl acetate and 17 parts by mass of methyl ethyl ketone.

To 100 g of the chief agent, 12.7 parts by mass of a polyvalent isocyanate compound (manufactured by Nippon Polyurethane Industry Co., Ltd., Coronate-HX) as a curing agent was added to obtain a coating composition.

Using the coating composition, a coated article was obtained in the same manner as in Example 16.

The 60° glosses of the coated article before and after the accelerated weathering test were measured. The results are shown in Table 2. Further, the color difference ΔE as between before and after the accelerated weathering test was obtained. The results are shown in Table 2.

Example 22

A chief agent was obtained in the same manner as in Example 16 except that the composite particles were changed to the composite particles in Example 17, the resin binder was changed to a solution (manufactured by Taisei Fine Chemical Co., Ltd., Acrit QT507-28, solid content: 50 mass %, solvent: toluene 25 mass %, butyl acetate: 25 mass %) of an acrylic polyol and that the amount of the composite particles was changed to 55 g. Based on 100 parts by mass in total of the chief agent, the chief agent comprised 23 parts by mass of the composite particles, 21 parts by mass of the acrylic polyol resin, 28 parts by mass of toluene, 11 parts by mass of butyl acetate and 17 parts by mass of methyl ethyl ketone.

To 100 g of the chief agent, 12.7 parts by mass of a polyvalent isocyanate compound (manufactured by Nippon Polyurethane Industry Co., Ltd., Coronate-HX) as a curing agent was added to obtain a coating composition.

Using the coating composition, a coated article was obtained in the same manner as in Example 16.

The 60° glosses of the coated article before and after the accelerated weathering test were measured. The results are shown in Table 2. Further, the color difference ΔE as between before and after the accelerated weathering test was obtained. The results are shown in Table 2.

Example 23

Composite particles as identified in Table 2 were obtained in the same manner as in Example 1 except that the amount of materials charged were changed.

A coating composition was obtained in the same manner as in Example 16 except that the composite particles were used.

A coated article was obtained in the same manner as in Example 16 using the coating composition.

The 60° glosses of the coated article before and after the accelerated weathering test were measured. The results are shown in Table 2. Further, the color difference ΔE as between before and after the accelerated weathering test was obtained. The results are shown in Table 2.

Example 24

A coating composition was obtained in the same manner as in Example 16 except that a titanium oxide pigment (manufactured by Ishihara Sangyo Kaisha Ltd., CR50, average particle size; 0.20 μm) was used instead of the composite particles.

A coated article was obtained in the same manner as in Example 16 using the coating composition.

The 60° glosses of the coated article before and after the accelerated weathering test were measured. The results are shown in Table 2. Further, the color difference ΔE as between before and after the accelerated weathering test was obtained. The results are shown in Table 2.

Examples 25 to 27

Composite particles as identified in Table 2 were obtained in the same manner as in Example 1 except that the amount of materials charged were changed.

A coating composition was obtained in the same manner as in Example 16 except that the composite particles were used.

A coated article was obtained in the same manner as in Example 16 using the coating composition.

The 60° glosses of the coated article before and after the accelerated weathering test were measured. The results are shown in Table 2. Further, the color difference ΔE as between before and after the accelerated weathering test was obtained. The results are shown in Table 2.

Example 28

A chief agent was obtained in the same manner as in Example 16 except that 55 g of a titanium oxide pigment (manufactured by Ishihara Sangyo Kaisha Ltd., CR50, average particle size; 0.20 μm) was used instead of 65 g of the composite particles, the resin binder was changed to a solution (manufactured by Taisei Fine Chemical Co., Ltd., Acrit QT507-28, solid content: 50 mass %, solvent: toluene 25 mass %, butyl acetate: 25 mass %) of an acrylic polyol and that the amount of the composite particles was changed to 55 g. Based on 100 parts by mass in total of the chief agent, the chief agent comprised 23 parts by mass of the composite particles, 21 parts by mass of the acrylic polyol resin, 28 parts by mass of toluene, 11 parts by mass of butyl acetate and 17 parts by mass of methyl ethyl ketone.

To 100 g of the chief agent, 12.7 parts by mass of a polyvalent isocyanate compound (manufactured by Nippon Polyurethane Industry Co., Ltd., Coronate-HX) as a curing agent was added to obtain a coating composition.

Using the coating composition, a coated article was obtained in the same manner as in Example 16.

The 60° glosses of the coated article before and after the accelerated weathering test were measured. The results are shown in Table 2. Further, the color difference ΔE as between before and after the accelerated weathering test was obtained. The results are shown in Table 2.

Examples 29 to 31

Composite particles as identified in Table 2 were obtained in the same manner as in Example 1 except that the amount of materials charged were changed.

A coating composition was obtained in the same manner as in Example 16 except that the composite particles were used.

A coated article was obtained in the same manner as in Example 16 using the coating composition.

The 60° glosses of the coated article before and after the accelerated weathering test were measured. The results are shown in Table 2. Further, the color difference ΔE as between before and after the accelerated weathering test was obtained. The results are shown in Table 2.

TABLE 2

| | Composite particles | | | | | | Coating | Accelerated weathering test | | | | |
| | | | | | | | | Before test | | After test | | |
| | mass % | | | Parts by mass | | | Average particle size μm | layer Resin binder | 60° gloss (%) | L/a/b | 60° gloss (%) | L/a/b | Color difference (ΔE) | Overall judgment |
| | $CeO_2$ | $SiO_2$ | $TiO_2$ | $CeO_2$ | $SiO_2$ | $TiO_2$ | | | | | | | | |
| Ex. 16 | 10 | 18 | 72 | 13.9 | 25.0 | 100.0 | 0.25 | F | 78 | 94.58/−1.12/4.62 | 78 | 94.32/−1.15/5.62 | 1.03 | ○ |
| Ex. 17 | 5 | 18 | 77 | 6.5 | 23.4 | 100.0 | 0.22 | F | 79 | 94.88/−0.99/3.44 | 77 | 94.23/−1.56/3.66 | 0.89 | ○ |
| Ex. 18 | 17.5 | 16.5 | 66 | 26.5 | 25.0 | 100.0 | 1.90 | F | 79 | 94.12/−2.78/5.77 | 77 | 93.00/−2.89/6.56 | 1.37 | ○ |
| Ex. 19 | 11.5 | 7 | 81.5 | 14.1 | 8.6 | 100.0 | 0.23 | F | 78 | 93.56/−1.77/3.99 | 78 | 93.21/−2.48/4.68 | 1.05 | ○ |

TABLE 2-continued

| | Composite particles | | | | | | Coating layer Resin binder | Accelerated weathering test | | | | | |
|---|---|---|---|---|---|---|---|---|---|---|---|---|---|
| | | | | | | | | Before test | | After test | | | |
| | mass % | | | Parts by mass | | | Average particle size μm | 60° gloss (%) | L/a/b | 60° gloss (%) | L/a/b | Color difference (ΔE) | Overall judgment |
| | CeO$_2$ | SiO$_2$ | TiO$_2$ | CeO$_2$ | SiO$_2$ | TiO$_2$ | | | | | | | |
| Ex. 20 | 12 | 30 | 55 | 21.8 | 54.5 | 100.0 | 1.00 | F | 79 | 94.25/−2.09/4.66 | 78 | 93.56/−2.33/4.88 | 0.76 | ○ |
| Ex. 21 | 10 | 18 | 72 | 13.9 | 25.0 | 100.0 | 0.25 | A | 79 | 94.52/−1.02/4.23 | 78 | 94.21/−1.24/4.42 | 0.42 | ○ |
| Ex. 22 | 5 | 18 | 77 | 6.5 | 23.4 | 100.0 | 0.22 | A | 79 | 94.22/−1.12/3.55 | 77 | 93.56/−2.00/3.89 | 1.15 | ○ |
| Ex. 23 | 2.5 | 19.5 | 78 | 3.2 | 25.0 | 100.0 | 0.25 | F | 79 | 95.12/−0.88/2.67 | 77 | 94.12/−1.00/4.10 | 1.75 | ○ |
| Ex. 24 | 0 | 0 | 100 | 0.0 | 0.0 | 100.0 | 0.20 | F | 79 | 95.52/−1.00/2.55 | 45 | 95.02/−1.44/2.66 | 0.68 | X |
| Ex. 25 | 22.5 | 15.5 | 62 | 36.3 | 25.0 | 100.0 | 2.00 | F | 79 | 94.52/−3.09/5.69 | 72 | 94.22/−3.81/8.52 | 2.94 | X |
| Ex. 26 | 12 | 3 | 85 | 14.1 | 3.5 | 100.0 | 0.26 | F | 79 | 93.93/−1.55/4.28 | 68 | 93.25/−2.20/8.01 | 3.85 | X |
| Ex. 27 | 12 | 38 | 50 | 24.0 | 76.0 | 100.0 | 3.40 | F | 76 | 95.02/−2.25/4.78 | 70 | 94.25/−2.89/5.99 | 1.57 | X |
| Ex. 28 | 0 | 0 | 100 | 0.0 | 0.0 | 100.0 | 0.20 | A | 79 | 95.25/−0.96/2.56 | 12 | 93.55/−1.32/4.02 | 2.27 | X |
| Ex. 29 | 1.5 | 29.5 | 69 | 2.2 | 42.8 | 100.0 | 0.66 | F | 79 | 94.66/−1.00/3.56 | 66 | 93.56/−1.67/4.56 | 1.63 | X |
| Ex. 30 | 1.5 | 10.5 | 88 | 1.7 | 11.9 | 100.0 | 0.86 | F | 79 | 95.02/−1.08/3.45 | 59 | 94.25/−1.66/4.00 | 1.11 | X |
| Ex. 31 | 0 | 40 | 60 | 0.0 | 66.7 | 100.0 | 1.66 | F | 79 | 95.11/−0.99/3.06 | 60 | 94.88/−1.11/4.12 | 1.09 | X |

F: fluororesin,
A: acrylic polyol,
transmittance: visible light transmittance

With respect to the coated articles in Examples 16 to 23, the change in the 60° gloss as between before and after the accelerated weathering test was small, and the color difference ΔE was small.

The decrease in the 60° gloss means cracking or falling off of some part of the coating layer. Considering the measurement error of about 1%, it can be judged that a decrease of about 2% as between before and after the test means no change or a small change. However, it is judged that a decrease by 3% or more means deterioration of the coating layer.

Further, with respect to the color difference ΔE, it is judged that a change by 3 or more as a general measurement indicates clear discoloration. Cerium oxide is originally pale yellow, and its yellowness increases when the silicon oxide layer is thin and it contains a small amount of water. This change of color does not directly indicate deterioration of the coating layer but is unfavorable with a view to maintaining the design. Accordingly, an example with a decrease in the 60° gloss by within 2% and ΔE within 3 was judged favorable and indicated by ○ in Table 2.

INDUSTRIAL APPLICABILITY

The composite particles of the present invention are useful as a pigment for a composition (printing ink, coating composition) for forming a coating layer containing a fluororesin. The printing ink of the present invention is useful as an ink for forming a coating layer on a resin film containing a fluororesin. The resin film with a coating layer of the present invention is useful for a roof material, wall covering material, etc. for buildings/architecture such as outdoor exhibition halls, sport facilities and agricultural greenhouses. Further, the coating composition of the present invention is useful as a coating compound to form a coating layer on the surface of an article. The coated article of the present invention is useful as transportation instruments, building materials, road materials, plant installations, agricultural installations, communication installations, electric instruments, etc.

The entire disclosure of Japanese Patent Application No. 2006-345949 filed on Dec. 22, 2006 including specification, claims, drawings and summary is incorporated herein by reference in its entirety.

What is claimed is:

1. Composite particles each comprising a particle containing titanium oxide, a first covering layer containing cerium oxide and a second covering layer containing silicon oxide in this order from the inside, wherein the amount of cerium oxide is from 3 to 30 parts by mass based on 100 parts by mass of titanium oxide, the amount of silicon oxide is from 5 to 60 parts by mass based on 100 parts by mass of titanium oxide, and the average particle size of the composite particles is from 0.15 to 3 μm.

2. The composite particles according to claim 1, wherein the amount of cerium oxide is from 5 to 30 parts by mass based on 100 parts by mass of titanium oxide.

3. A composition for forming a coating layer, which comprises the composite particles as defined in claim 1, a resin and a liquid medium.

4. The composition for forming a coating layer according to claim 3, wherein the resin is a fluororesin.

5. The composition for forming a coating layer according to claim 4, wherein the liquid medium is a solvent for the resin.

6. A printing ink comprising the composition for forming a coating layer as defined in claim 3.

7. A coating composition comprising the composition for forming a coating layer as defined in claim 3.

8. A coated article having a coating layer formed from the composition for forming a coating layer as defined in claim 3.

9. A resin film having a coating layer formed from the composition for forming a coating layer as defined in claim 3 on at least one side.

10. The resin film according to claim 9, wherein the amount of cerium oxide in the first covering layer of the composite particles is from 5 to 30 parts by mass based on 100 parts by mass of titanium oxide and the resin in the composition for forming the coating layer is a fluororesin.

11. The resin film according to claim 9, wherein the coating layer is a coating layer formed from the composition for forming a coating layer by a printing method.

12. The resin film according to claim 9, wherein the resin film is a fluororesin film.

13. The resin film according to claim 9, which has a visible light transmittance of from 20 to 75% as measured in accordance with JIS R3106.

14. The resin film according to claim 9, wherein the amount of cerium oxide in the first covering layer of the composite particles is from 5 to 30 parts by mass based on 100 parts by mass of titanium oxide.

15. The resin film according to claim 9, wherein the resin in the composition for forming the coating layer is a fluororesin.

16. The resin film according to claim 9, wherein the liquid medium in the composition for forming the coating layer is a solvent for the resin.

17. The resin film according to claim 9, wherein the resin film is a fluororesin film and the resin in the composition for forming the coating layer is a fluororesin.

* * * * *